(12) United States Patent
Sahita et al.

(10) Patent No.: US 10,705,976 B2
(45) Date of Patent: Jul. 7, 2020

(54) SCALABLE PROCESSOR-ASSISTED GUEST PHYSICAL ADDRESS TRANSLATION

(71) Applicant: Intel Corporation, Santa Clara, CA (US)

(72) Inventors: Ravi Sahita, Portland, OR (US); Barry E. Huntley, Hillsboro, OR (US); Vedvyas Shanbhogue, Austin, TX (US); Dror Caspi, Kiryat Yam (IL); Baruch Chaikin, D.N. Misagv (IL); Gilbert Neiger, Portland, OR (US); Arie Aharon, Haifa (IL); Arumugam Thiyagarajah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 16/023,537

(22) Filed: Jun. 29, 2018

(65) Prior Publication Data

US 2019/0042467 A1 Feb. 7, 2019

(51) Int. Cl.
| | |
|---|---|
| *G06F 12/1036* | (2016.01) |
| *G06F 12/14* | (2006.01) |
| *G06F 9/455* | (2018.01) |
| *G06F 12/109* | (2016.01) |
| *G06F 21/53* | (2013.01) |
| *G06F 21/78* | (2013.01) |
| G06F 12/1009 | (2016.01) |
| G06F 12/02 | (2006.01) |

(52) U.S. Cl.
CPC ...... *G06F 12/1036* (2013.01); *G06F 9/45558* (2013.01); *G06F 12/109* (2013.01); *G06F 12/1408* (2013.01); *G06F 12/1441* (2013.01); *G06F 21/53* (2013.01); *G06F 21/78* (2013.01); *G06F 12/0246* (2013.01); *G06F 12/1009* (2013.01); *G06F 2009/45583* (2013.01); *G06F 2212/1052* (2013.01); *G06F 2212/151* (2013.01); *G06F 2212/651* (2013.01); *G06F 2212/657* (2013.01); *G06F 2212/684* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 2011/0208935 | A1* | 8/2011 | Grisenthwaite | G06F 12/1009 711/163 |
| 2012/0047580 | A1* | 2/2012 | Smith | G06F 21/53 726/24 |
| 2016/0283717 | A1* | 9/2016 | Lemay | G06F 21/567 |
| 2016/0350019 | A1* | 12/2016 | Koufaty | G06F 3/0622 |
| 2016/0364341 | A1* | 12/2016 | Banginwar | G06F 12/145 |

* cited by examiner

*Primary Examiner* — Nicholas J Simonetti
(74) *Attorney, Agent, or Firm* — Compass IP Law, PC

(57) ABSTRACT

Examples include a processor including at least one untrusted extended page table (EPT), circuitry to execute a set of instructions of the instruction set architecture (ISA) of the processor to manage at least one secure extended page table (SEPT), and a physical address translation component to translate a guest physical address of a guest physical memory to a host physical address of a host physical memory using one of the at least one untrusted EPT and the at least one SEPT.

21 Claims, 15 Drawing Sheets

GUEST PHYSICAL MEMORY

ENCRYPTED, INTEGRITY PROTECTED USING KEY FOR TRUSTED DOMAIN 1
402

ENCRYPTED, INTEGRITY PROTECTED USING KEY FOR TRUSTED DOMAIN 2
404

ENCRYPTED, INTEGRITY PROTECTED USING KEY FOR TRUSTED DOMAIN N
406

ENCRYPTED, INTEGRITY PROTECTED USING MEMORY ENCRYPTION
408

SCALABLE PROCESSOR-ASSISTED GUEST PHYSICAL ADDRESS TRANSLATION

TECHNICAL FIELD

Examples described herein are generally related to techniques used by a processor when translating addresses.

BACKGROUND

In computing, a virtual machine (VM) is an emulation of a computer system. VMs are based on a specific computer architecture and provide the functionality of an underlying physical computer system. Their implementations may involve specialized hardware, software, or a combination. A Virtual Machine Monitor (VMM) (also known as a hypervisor) is a software program that enables the creation, management and governance of VMs and manages the operation of a virtualized environment on top of a physical host machine. A VMM is the primary software behind virtualization environments and implementations. When installed over a host machine, VMM facilitates the creation of VMs, each with separate operating systems (OS) and applications. VMM manages the backend operation of these VMs by allocating the necessary computing, memory, storage and other input/output (I/O) resources. VMM also provides a centralized interface for managing the entire operation, status and availability of VMs that are installed over a single host machine or spread across different and interconnected hosts.

To achieve confidential and/or protected VM execution, the memory and the runtime processor state of the host machine must also be protected. It is not sufficient to maintain the confidentiality (and integrity) of just the memory assigned to a VM. It is also desired to prevent a malicious or exploited VMM from performing page remapping attacks for a memory address space via the use of extended page tables (EPT) to alter the final page mappings a VM uses. No complete solution exists to this problem to date.

DETAILED DESCRIPTION

Figure 1A:
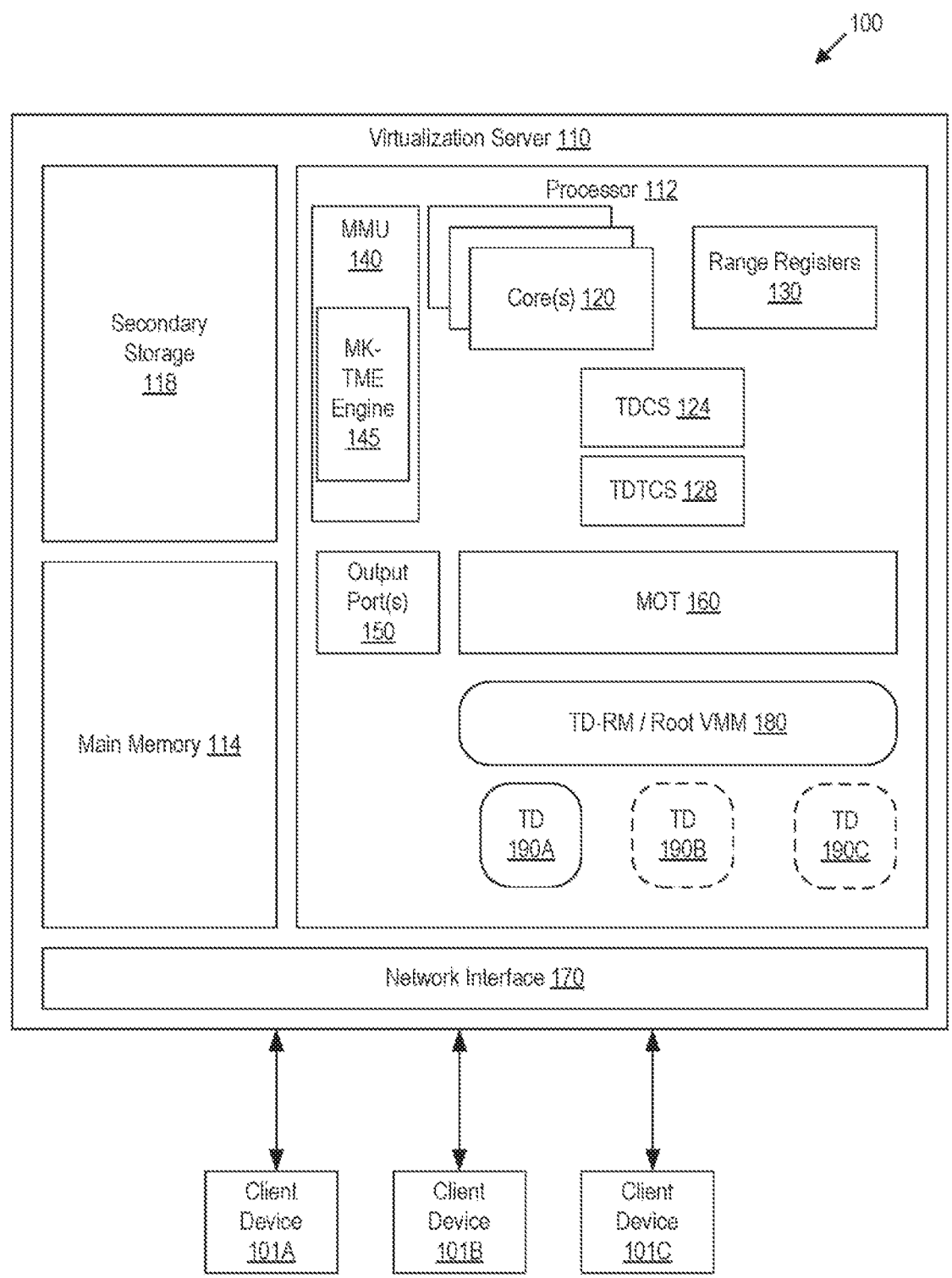
FIG. 1A is a block diagram illustrating an example computing system that provides isolation in virtualized systems using trust domains according to one implementation.

As contemplated in the present disclosure, embodiments of the present invention include a processor security capability called Trusted Domain Extensions (TDX) to meet increased security objectives via the use of memory encryption and integrity via memory controller engines. As used in TDX, a Trusted Domain (TD) is a protected VM. Embodiments of the present invention deter page remapping attacks from a malicious or exploited VMM on the private memory address space of a TD.

Embodiments comprise an additional extended page table (EPT) structure called a Secure Extended Page Table (SEPT) that is used by a processor for TD private page walks. The SEPT is a per-TD EPT (i.e., each TD has its own SEPT) that is managed by a Trusted Domain Resource Manager (TDRM) only via special instructions newly added to the instruction set architecture (ISA) of the processor. The TDRM cannot alter SEPT without using these instructions otherwise an integrity failure will be reported by the processor. In other embodiments, all or parts of the SEPT may be access-controlled using processor range-register protection.

In typical VM implementations, the processor supports one EPT pointer (EPTP) per virtual memory control structure (VMCS). The VMCS is a data structure in memory that exists once per VM, while the VM is managed by the VMM. With every change of the execution context between different VMs, the VMCS is restored for the current VM, thereby defining the state of the VM's virtual processor. The VMM manages the EPT referenced by the EPTP. In embodiments of the present invention, the VMs may be encapsulated by TDs, and the VMCS may be replaced by an analogous control structure called the Trusted Domain Control Structure (TDCS) that manages the guest state of TDs.

In embodiments of the present invention, at least two new components are used.

1) Page Miss Handler (PMH): The processor supports a new root pointer called a Trusted Domain (TD) Secure Extended Page Table Pointer (SEPTP) (pointing to the SEPT currently being accessed) and for TD private page accesses performs a nested page walk through the TD OS-managed guest page table (PT) and the SEPT by the page miss handler. For non-private (i.e., shared) memory accesses, the processor performs an ordinary page walk using the untrusted EPT.

2) Instruction Set Architecture (ISA) to manage SEPT: The processor supports a set of instructions to safely allow the TDRM to manipulate the SEPT without violation of the security objectives—namely that the guest physical address (GPA) to host physical address (HPA) mapping (and GPA attributes) cannot be modified once a page of memory is assigned to a TD. This ISA entails SEPT management using instructions to add a page to a TD, to make a late addition of a page to a TD, to provide memory swapping support for pages assigned to a TD, and to remove a page from a TD. In addition, the processor provides the ISA to explicitly manage SEPT pages.

Addressing EPT remap attacks is one of the core requirements of removing the hypervisor from the Trusted Computing Base (TCB) for TDX to meet cloud service provider requirements. At the same time, the memory management flexibility of the TDRM must be retained for a scalable memory management scheme (e.g., supporting fragmented memory allocation, on-demand assignment, page swapping, etc.,). Embodiments of the present invention meets those non-security requirements as well.

An architecture to provide isolation in virtualized systems using trust domains (TDs) is described. A current trend in computing is the placement of data and enterprise workloads in the cloud by utilizing hosting services provided by cloud service providers (CSPs). As a result of the hosting of the data and enterprise workloads in the cloud, customers (referred to as tenants herein) of the CSPs are requesting better security and isolation solutions for their workloads. In particular, customers are seeking out solutions that enable the operation of CSP-provided software outside of a TCB of the tenant's software. The TCB of a system refers to a set of hardware, firmware, and/or software components that have an ability to influence the trust for the overall operation of the system.

In implementations of the disclosure, a TD architecture and instruction set architecture (ISA) extensions (referred to herein as TD extensions (TDX)) for the TD architecture is provided to provide confidentiality (and integrity) for customer (tenant) software executing in an untrusted CSP infrastructure. The TD architecture, which can be a System-on-Chip (SoC) capability, provides isolation between TD workloads and CSP software, such as a virtual machine manager (VMM) of the CSP. Components of the TD architecture can include 1) memory encryption via a MK-Total Memory Encryption (MKTME) engine, 2) a resource management capability referred to herein as the trust domain resource manager (TDRM) (a TDRM may be a software extension of the Virtual Machine Monitor (VMM)), and 3) execution state and memory isolation capabilities in the processor provided via a CPU-managed Memory Ownership Table (MOT) and via CPU access-controlled TD control structures. The TD architecture provides an ability of the processor to deploy TDs that leverage the MK-TME engine, the MOT, and the access-controlled TD control structures for secure operation of TD workloads.

In one implementation, the tenant's software is executed in an architectural concept known as a TD. A TD (also referred to as a tenant TD) refers to a tenant workload (which can comprise an operating system (OS) alone along with other ring-3 applications running on top of the OS, or a virtual machine (VM) running on top of a VMM along with other ring-3 applications, for example). Each TD operates independently of other TDs in the system and uses logical processor(s), memory, and I/O assigned by the TDRM on the platform. Each TD is cryptographically isolated in memory using at least one exclusive encryption key of the MK-TME engine for encrypting the memory (holding code and/or data) associated with the trust domain.

In implementations of the disclosure, the TDRM in the TD architecture acts as a host for the TDs and has full control of the cores and other platform hardware. A TDRM assigns software in a TD with logical processor(s). The TDRM, however, cannot access a TD's execution state on the assigned logical processor(s). Similarly, a TDRM assigns physical memory and I/O resources to the TDs, but is not privy to access the memory state of a TD due to the use of separate encryption keys enforced by the processors per TD, and other integrity and replay controls on memory.

Software executing in a TD operates with reduced privileges so that the TDRM can retain control of platform resources. However, the TDRM cannot affect the confidentiality or integrity of the TD state in memory or in the CPU structures under defined circumstances.

Conventional systems for providing isolation in virtualized systems do not extract the CSP software out of the tenant's TCB completely. Furthermore, conventional systems may increase the TCB significantly using separate chipset subsystems that implementations of the disclosure avoid. The TD architecture of implementations of the disclosure provides isolation between customer (tenant) workloads and CSP software by explicitly reducing the TCB by removing the CSP software from the TCB. Implementations provide a technical improvement over conventional systems by providing secure isolation for CSP customer workloads (tenant TDs) and allow for the removal of CSP software from a customer's TCB while meeting security and functionality requirements of the CSP. In addition, the TD architecture is scalable to multiple TDs, which can support multiple tenant workloads. Furthermore, the TD architecture described herein is generic and can be applied to any dynamic random-access memory (DRAM), or storage class memory (SCM)-based memory, such as Non-Volatile Dual In-line Memory Module (NVDIMM). As such, implementations of the disclosure allow software to take advantage of performance benefits, such as NVDIMM direct access storage (DAS) mode for SCM, without compromising platform security requirements.

FIG. 1A is a schematic block diagram of a computing system 100 that provides isolation in virtualized systems using TDs, according to an implementation of the disclosure. The virtualization system 100 includes a virtualization server 110 that supports a number of client devices 101A-101 C. The virtualization server 110 includes at least one processor 112 (also referred to as a processing device) that executes a TDRM 180. The TDRM 180 may include a VMM (may also be referred to as hypervisor) that may instantiate one or more TDs 190A-190C accessible by the client devices 101A-101C via a network interface 170. The client devices 101A-101 C may include, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device.

A TD may refer to a tenant (e.g., customer) workload. The tenant workload can include an OS alone along with other ring-3 applications running on top of the OS, or can include a VM running on top of a VMM along with other ring-3 applications, for example. In implementations of the disclosure, each TD may be cryptographically isolated in memory using a separate exclusive key for encrypting the memory (holding code and data) associated with the TD.

Figure 1B:
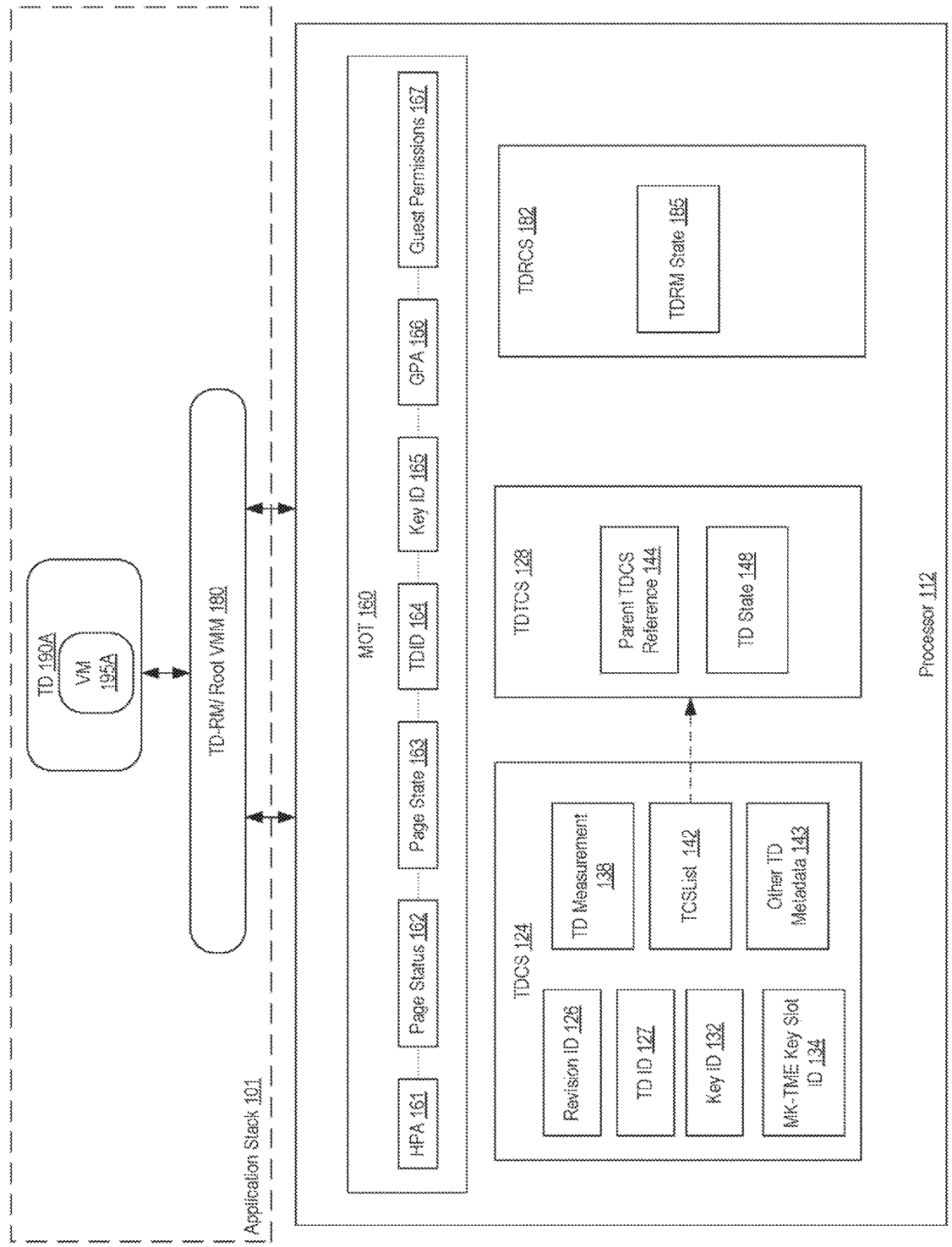
FIG. 1B is a block diagram illustrating another example computing system that provides isolation in virtualized systems using trust domains according to one implementation.

Processor 112 may include one or more cores 120 (also referred to as processing cores 120), range registers 130, a memory management unit (MMU) 140, and output port(s) 150. FIG. 1B is a schematic block diagram of a detailed view of a processor core 120 executing a TDRM 180 in communication with a MOT 160 and one or more trust domain control structure(s) (TDCS(s)) 124 and trust domain thread control structure(s) (TDTCS(s)) 128, as shown in FIG. 1A. TDTCS and TD-TCS may be used interchangeable herein. Processor 112 may be used in a system that includes, but is not limited to, a desktop computer, a tablet computer, a netbook, a notebook computer, a PDA, a server, a workstation, a cellular telephone, a mobile computing device, a smart phone, an Internet appliance or any other type of computing device. In another implementation, processor 112 may be used in a SoC system.

The computing system 100 is representative of processing systems based on micro-processing devices available from Intel Corporation of Santa Clara, Calif., although other systems (including PCs having other micro-processing devices, engineering workstations, set-top boxes and the like) may also be used. In one implementation, sample system 100 executes a version of the WINDOWS™ operating system available from Microsoft Corporation of Redmond, Wash., although other operating systems (UNIX and Linux for example), embedded software, and/or graphical user interfaces, may also be used. Thus, implementations of the disclosure are not limited to any specific combination of hardware circuitry and software.

The one or more processing cores 120 execute instructions of the system. The processing core 120 includes, but is not limited to, pre-fetch logic to fetch instructions, decode logic to decode the instructions, execution logic to execute instructions and the like. In an implementation, the computing system 100 includes a component, such as the processor 112 to employ execution units including logic to perform algorithms for processing data.

The virtualization server 110 includes a main memory 114 and a secondary storage 118 to store program binaries and OS driver events. Data in the secondary storage 118 may be stored in blocks referred to as pages, and each page may correspond to a set of physical memory addresses. The virtualization server 110 may employ virtual memory management in which applications run by the core(s) 120, such as the TDs 190A-190C, use virtual memory addresses that are mapped to guest physical memory addresses, and guest physical memory addresses are mapped to host/system physical addresses by MMU 140.

The core 120 may execute the MMU 140 to load pages from the secondary storage 118 into the main memory 114 (which includes a volatile memory and/or a nonvolatile memory) for faster access by software running on the processor 112 (e.g., on the core). When one of the TDs 190A-190C attempts to access a virtual memory address that corresponds to a physical memory address of a page loaded into the main memory 114, the MMU 140 returns the requested data. The core 120 may execute the VMM portion of TDRM 180 to translate guest physical addresses to host physical addresses of main memory and provide parameters for a protocol that allows the core 120 to read, walk and interpret these mappings.

In one implementation, processor 112 implements a TD architecture and ISA extensions (TDX) for the TD architecture. The TD architecture provides isolation between TD workloads 190A-190C and from CSP software (e.g., TDRM 180 and/or a CSP VMM (e.g., root VMM 180)) executing on the processor 112). Components of the TD architecture can include 1) memory encryption via MK-TME engine 145, 2) a resource management capability referred to herein as the TDRM 180, and 3) execution state and memory isolation capabilities in the processor 112 provided via a MOT 160 and via access-controlled TD control structures (i.e., TDCS 124 and TDTCS 128). The TDX architecture provides an ability of the processor 112 to deploy TDs 190A-190C that leverage the MK-TME engine 145, the MOT 160, and the access-controlled TD control structures (i.e., TDCS 124 and TDTCS 128) for secure operation of TD workloads 190A-190C.

In implementations of the disclosure, the TDRM 180 acts as a host and has full control of the cores 120 and other platform hardware. A TDRM 180 assigns software in a TD 190A-190C with logical processor(s). The TDRM 180, however, cannot access a TD's 190A-190C execution state on the assigned logical processor(s). Similarly, a TDRM 180 assigns physical memory and I/O resources to the TDs 190A-190C, but is not privy to access the memory state of a TD 190A due to separate encryption keys, and other integrity and replay controls on memory.

With respect to the separate encryption keys, the processor may utilize the MK-TME engine 145 to encrypt (and decrypt) memory used during execution. With total memory encryption (TME), any memory accesses by software executing on the core 120 can be encrypted in memory with an encryption key. MK-TME is an enhancement to TME that allows use of multiple encryption keys (the number of supported keys is implementation dependent). The processor 112 may utilize the MKTME engine 145 to cause different pages to be encrypted using different MK-TME keys. The MK-TME engine 145 may be utilized in the TD architecture described herein to support one or more encryption keys per each TD 190A-190C to help achieve the cryptographic isolation between different CSP customer workloads. For example, when MK-TME engine 145 is used in the TD architecture, the CPU enforces by default that TD (all pages) are to be encrypted using a TD-specific key. Furthermore, a TD may further choose specific TD pages to be plain text or encrypted using different ephemeral keys that are opaque to CSP software.

Each TD 190A-190C is a software environment that supports a software stack consisting of VMMs (e.g., using virtual machine extensions (VMX)), OSes, and/or application software (hosted by the OS). Each TD 190A-190C operates independently of other TDs 190A-190C and uses logical processor(s), memory, and I/O assigned by the TDRM 180 on the platform. Software executing in a TD 190A-190C operates with reduced privileges so that the TDRM 180 can retain control of platform resources; however, the TDRM cannot affect the confidentiality or integrity of the TD 190A-190C under defined circumstances. Further details of the TD architecture and TDX are described in more detail below with reference to FIG. 1B.

Implementations of the disclosure are not limited to computer systems. Alternative implementations of the disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processing device (DSP), system on a chip, network computers (NetPC), set-top boxes, network hubs, wide area network (WAN) switches, or any other system that can perform one or more instructions in accordance with at least one implementation.

One implementation may be described in the context of a single processing device desktop or server system, but alternative implementations may be included in a multiprocessing device system. Computing system 100 may be an example of a 'hub' system architecture. The computing system 100 includes a processor 112 to process data signals. The processor 112, as one illustrative example, includes a complex instruction set computer (CISC) micro-processing device, a reduced instruction set computing (RISC) micro-processing device, a very long instruction word (VLIW) micro-processing device, a processing device implementing a combination of instruction sets, or any other processing device, such as a digital signal processing device, for example. The processor 112 is coupled to a processing device bus that transmits data signals between the processor 112 and other components in the computing system 100, such as main memory 114 and/or secondary storage 118, storing instruction, data, or any combination thereof. The other components of the computing system 100 may include a graphics accelerator, a memory controller hub, an I/O controller hub, a wireless transceiver, a Flash BIOS, a network controller, an audio controller, a serial expansion port, an 1/0 controller, etc. These elements perform their conventional functions that are well known to those familiar with the art.

In one implementation, processor 112 includes a Level 1 (L1) internal cache memory. Depending on the architecture, the processor 112 may have a single internal cache or multiple levels of internal caches. Other implementations include a combination of both internal and external caches depending on the particular implementation and needs. A register file is to store different types of data in various registers including integer registers, floating point registers, vector registers, banked registers, shadow registers, checkpoint registers, status registers, configuration registers, and instruction pointer register.

It should be noted that the execution unit may or may not have a floating point unit. The processor 112, in one implementation, includes a microcode (ucode) ROM to store microcode, which when executed, is to perform algorithms for certain macroinstructions or handle complex scenarios. Here, microcode is potentially updateable to handle logic bugs/fixes for processor 112.

Alternate implementations of an execution unit may also be used in micro controllers, embedded processing devices, graphics devices, DSPs, and other types of logic circuits. System 100 includes a main memory 114 (may also be referred to as memory 114). Main memory 114 includes a DRAM device, a static random-access memory (SRAM) device, flash memory device, or other memory device. Main memory 114 stores instructions and/or data represented by data signals that are to be executed by the processor 112. The processor 112 is coupled to the main memory 114 via a processing device bus. A system logic chip, such as a memory controller hub (MCH) may be coupled to the processing device bus and main memory 114. An MCH can provide a high bandwidth memory path to main memory 114 for instruction and data storage and for storage of graphics commands, data and textures. The MCH can be used to direct data signals between the processor 112, main memory 114, and other components in the system 100 and to bridge the data signals between processing device bus, memory 114, and system 1/0, for example. The MCH may be coupled to memory 114 through a memory interface. In some implementations, the system logic chip can provide a graphics port for coupling to a graphics controller through an Accelerated Graphics Port (AGP) interconnect.

The computing system 100 may also include an I/O controller hub (ICH). The ICH can provide direct connections to some I/O devices via a local I/O bus. The local I/O bus is a high-speed I/O bus for connecting peripherals to the memory 114, chipset, and processor 112. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another implementation of a system, the instructions executed by the processing device core 120 described above can be used with a system on a chip. One implementation of a system on a chip comprises of a processing device and a memory. The memory for one such system is a flash memory. The flash memory can be located on the same die as the processing device and other system components. Additionally, other logic blocks such as a memory controller or graphics controller can also be located on a system on a chip.

With reference to FIG. 1B, this figure depicts a block diagram of the processor 112 of FIG. 1A, according to one implementation of the disclosure. In one implementation, the processor 112 may execute an application stack 101 via a single core 120 or across several cores 120. As discussed above, the processor 112 may provide a TD architecture and TDX to provide confidentiality (and integrity) for customer software running in the customer/tenants (i.e., TDs 190A) in an untrusted cloud service providers (CSP) infrastructure. The TD architecture provides for memory isolation via a MOT 160; CPU state isolation that incorporates CPU key management via TDCS 124 and/or TDTCS 128; and CPU measurement infrastructure for TD 190A software.

In one implementation, TD architecture provides ISA extensions (referred to as TDX) that support confidential operation of OS and OS-managed applications (virtualized and non-virtualized). A platform, such as one including processor 112, with TDX enabled can function as multiple encrypted contexts referred to as TDs. For ease of explanation, a single TD 190A is depicted in FIG. 1B. Each TD 190A can run VMMs, VMs, OSes, and/or applications. For example, TD 190A is depicted as hosting VM 195A.

In one implementation, the TDRM 180 may include as part of VMM functionality (e.g., root VMM). A VMM may refer to software, firmware, or hardware to create, run, and manage a virtual machines (VM), such as VM 195A. It should be noted that the VMM may create, run, and manage one or more VMs. As depicted, the VMM 110 is included as a component of one or more processing cores 120 of a processing device 122. The VMM 110 may create and run the VM 195A and allocate one or more virtual processors (e.g., vCPUs) to the VM 195A. The VM 195A may be referred to as guest 195A herein. The VMM may allow the VM 195A to access hardware of the underlying computing system, such as computing system 100 of FIG. 1A. The VM 195A may execute a guest operating system (OS). The VMM may manage the execution of the guest OS. The guest OS may function to control access of virtual processors of the VM 195A to underlying hardware and software resources of the computing system 100. It should be noted that, when there are numerous VMs 195A operating on the processing device 112, the VMM may manage each of the guest OSes executing on the numerous guests. In some implementations, a VMM may be implemented with the TD 190A to manage the VMs 195A. This VMM may be referred to as a tenant VMM and/or a non-root VMM and is discussed in further detail below.

TDX also provides a programming interface for a TD management layer of the TD architecture referred to as the TDRM 180. A TDRM may be implemented as part of the CSP/root VMM. The TDRM 180 manages the operation of TDs 190A. While a TDRM 180 can assign and manage resources, such as CPU, memory and input/output (I/O) to TDs 190A, the TDRM 180 is designed to operate outside of a TCB of the TDs 190A. The TCB of a system refers to a set of hardware, firmware, and/or software component that have an ability to influence the trust for the overall operation of the system.

In one implementation, the TD architecture is thus a capability to protect software running in a TD 190A. As discussed above, components of the TD architecture may include 1) Memory encryption via a TME engine having Multi-key extensions to TME (e.g., MK-TME engine 145 of FIG. 1A), 2) a software resource management layer (TDRM 180), and 3) execution state and memory isolation capabilities in the TD architecture.

Figure 2A:
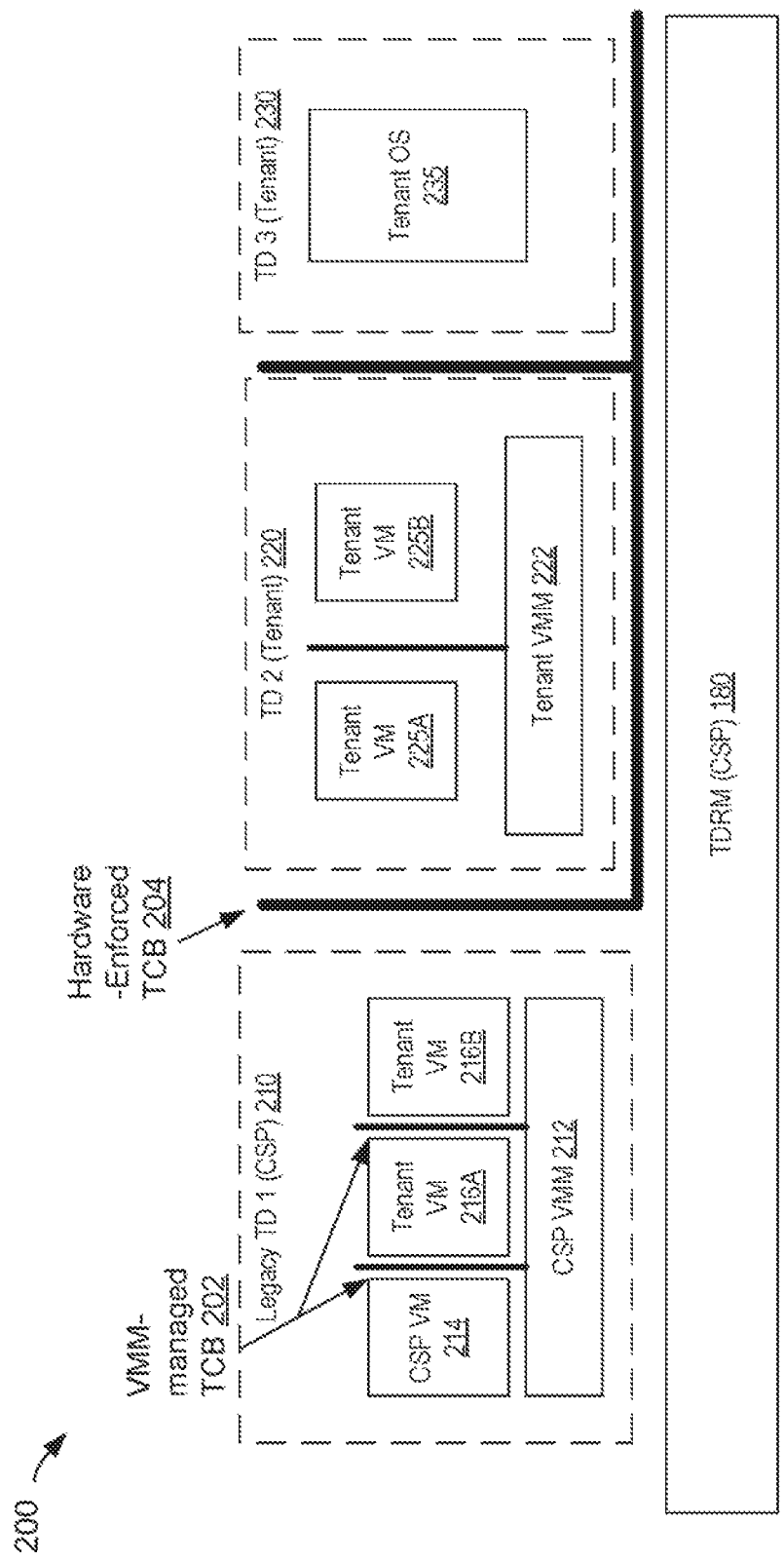
FIG. 2A is a block diagram of an example of a trust domain architecture according to one implementation.

FIG. 2A is a block diagram depicting an example computing system implementing TD architecture 200. The TD architecture 200 supports two types of TDs. A first type of TD is a TD where the tenant trusts the CSP to enforce confidentiality and does not implement the TD architecture of implementations of the disclosure. This type of legacy TD is depicted as TD 1 210. TD 1 210 is a CSP TD having a CSP VMM-managed TCB 202. TD 1 210 may include a CSP VMM 212 managing a CSP VM 214 and/or one or more tenant VMs 216A, 216B. In this case, the tenant VMs 216A, 216B are managed by the CSP VMM 212 that is in the VM's 216A, 216B TCB 202. In implementations of the disclosure, the tenant VMs 216A, 216B may still leverage memory encryption via TME or MK-TME in this model (described further below).

The other type of TD is a TD is a TD where the tenant does not trust the CSP to enforce confidentiality and thus relies on the CPU with TD architecture of implementations of the disclosure. This type of TD is shown in two variants as TD2 220 and TD3 230. The TD2 220 is shown with a virtualization mode (such as VMX) being utilized by the tenant VMM (non-root) 222 running in TD2 220 to managed tenant VMs 225A, 225B. The TD3 230 does not include software using a virtualization mode, but instead runs an enlightened OS 235 in the TD3 230 directly. TD2 220 and TD3 230 are tenant TDs having a hardware-enforced TCB 204 as described in implementations of the disclosure. In one implementation, TD2 220 or TD3 230 may be the same as TD 190A described with respect to FIGS. 1A and/or 1B.

The TDRM 180 manages the life cycle of all three types of TDs 210, 220, 230, including allocation of resources. However, the TDRM 180 is not in the TCB for TD types TD2 220 and TD3 230. The TD architecture 200 does not place any architectural restrictions on the number or mix of TDs active on a system. However, software and certain hardware limitations in a specific implementation may limit the number of TDs running concurrently on a system due to other constraints.

Figure 2B:
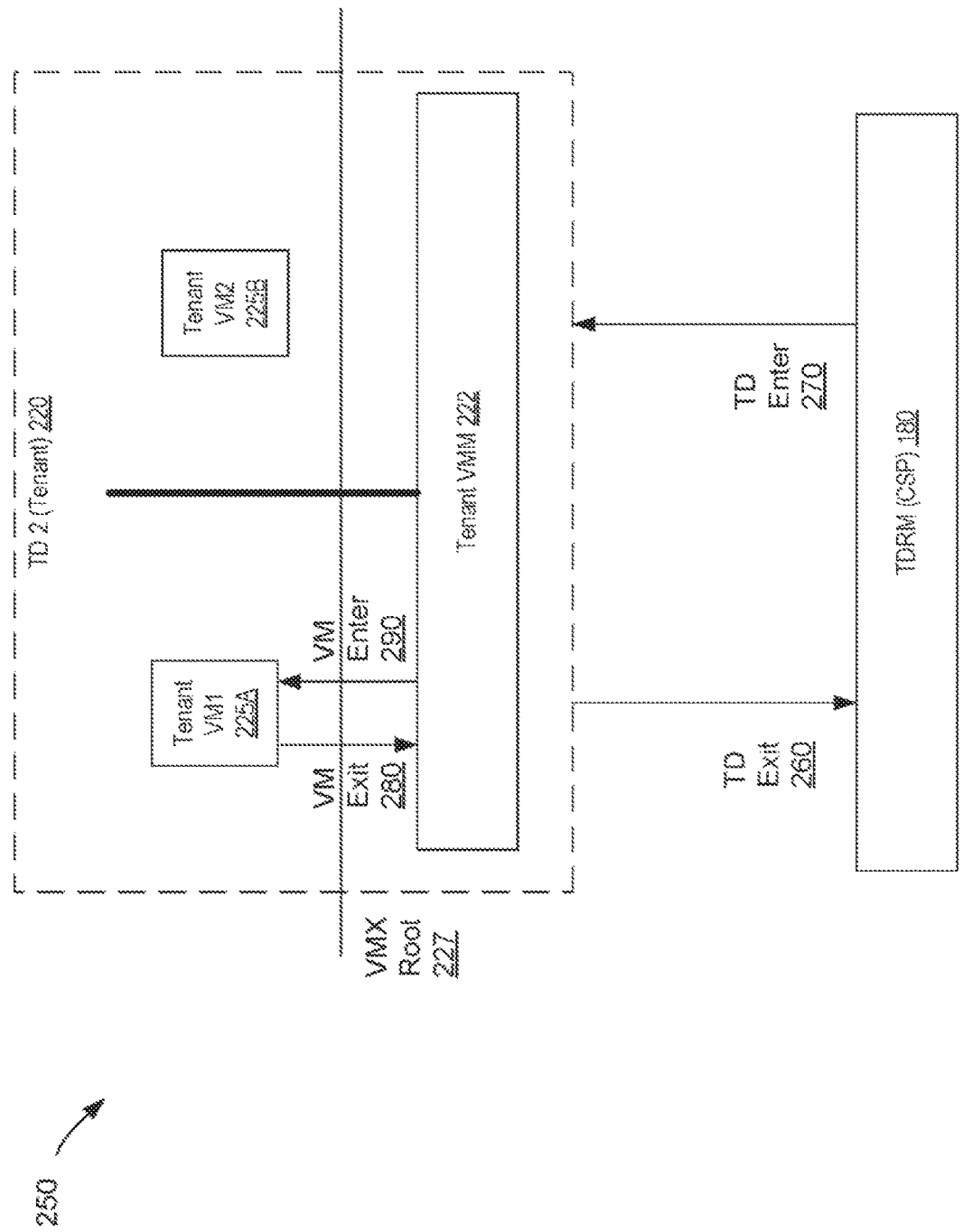
FIG. 2B is a block diagram of another example of a trust domain architecture according to one implementation.

FIG. 2B is a block diagram depicting an example of a TD architecture 250 and the interactions between a TD 220 and TDRM 280. In one implementation, TD 220 and TDRM 280 are the same as their counterparts described with respect to FIG. 2A. The TD architecture 250 may be the same as a TD architecture provided by computing device 100 of FIGS. 1A and 1B, and/or TD architecture 200 of FIG. 2A. TD architecture 250 provides a layer that manages lifecycle of TDs active on a system. Processor support for TDs is provided by a form of processor operation called a TDX operation. There are two kinds of TDX operations: a Resource Manager operation and a Tenant operation. In general, the TDRM 180 runs in TDX Resource Manager operation and TDs, such as TD2 220, run in TDX Tenant operation. Transitions between Resource-Manager operation and Tenant operation are called TDX transitions.

There are two kinds of TDX transitions: TD entry 270 and TD exit 260. Transitions from TDX Resource-Manager operation into TDX Tenant operation are called TD entries 270. Transitions from TDX Tenant operation to TDX Resource Manager operation are called TD exits 260.

Processor behavior in TDX Resource-Manager operation is similar as it is outside of TDX operation. The principal differences are that a set of TDX operations (TDX instructions) is available and that values that can be loaded into certain control registers are limited to restrict the modes and abilities of the TDRM 180.

Processor behavior in TDX Tenant operation is similarly restricted to facilitate isolation. For example, instead of ordinary operation, certain events cause TD exits 260 to the TDRM 180. These TD exits 260 do not allow the TDRM 180 to modify TD 220 behavior or state. The TDRM 180 uses platform capabilities to retain control of platform resources. Software running in a TD 220 may use software-visible information to determine it is running in a TD 220, and may enforce local measurement policies on additional software loaded into the TD 220. However, validating the security state of the TD 220 is performed by a remote attestation party to ensure confidentiality.

The TD architecture 250 is designed to minimize compatibility impact on software that relies on virtualization when running in a TD 220, and therefore, leaves most interactions between a VM 225A, 225B running in Tenant operation and a Tenant VMM 222 running in Tenant operation unchanged. If there is no VMM 222 present in a TD 220, a VM OS may be modified to work with TDRM 180 as the root VMM.

In one implementation, the TDRM 180 may explicitly decide to cause a TD exit 260, for example, to terminate a TD 120 or to manage memory resources (e.g., yield assigned memory resource, request free memory resources, etc.). The TD architecture 250 also provides the TDRM 180 with the ability to force TD exits 260 for preemption. On TD exits 260, the TD architecture enforces that the execution state of a TD 220 is saved in CPU access-controlled memory allocated to the TD 220 and encrypted using a unique encryption key (discussed further below) of the TD 220 that is not visible to TDRM 180 or other TDs to protect confidentiality of TD state from the TDRM 180 or other TDs. The TD execution state may similarly be protected against spoofing, remapping and/or replay via integrity controls on memory.

TD enter 270 is a complementary event to TD exit 260. For example, a TD enter 270 may occur when the TDRM 180 schedules a TD 220 to run on a logical processor and transfers execution to the software running in the TD 220. During TD enter 270, the TD architecture 250 enforces that the execution state of the TDRM 180 is saved in memory owned by the TDRM, which is encrypted using a unique encryption key assigned for sole use by the TDRM 180.

TDs, such as TD 220, can be set up by the TDRM 180 using a TDCREATE (to create TDCS), TDTCREATE (to create TD-TCS) and TDADDPAGE instructions that causes memory belonging to a TD 220 to be encrypted using the TD's unique encryption key that is not visible or accessible to the TDRM 180 or other TDs. Before executing any instructions belonging to a TD, all TD memory is encrypted using the TD's unique key. Although specific instruction names are referenced herein, other names for the instructions may be utilized in implementations of the disclosure and are not limited to the specific names provided herein.

In one implementation, the TDRM 180 can launch each TD 220 with a small software image (similar to IBB or Initial Boot Block) after signature verification and record the IBB measurements (for subsequent attestation) using a platform root of trust. It is the IBB software executing in the TD 220 that is responsible for completing the measured launch of the TD 220 and requesting additional resources from the TDRM 180. The TD 220 has the option to use a single encryption key for the entire TD 220 or use additional encryption keys for different Tenant VMs 225A, 225B (and/or containers or different memory resources such as NVRAM) when running inside the TD 220. Thus, when the TD 220 is first set up, the TD 220 is using an exclusive CPU-generated MK-TME key. Thereafter, the TD 220 may optionally set up additional MK-TME encryption keys for each tenant software-managed context that operates inside the TD 220 (e.g., tenant VMs 225A, 225B, containers or other memory types).

In order to minimize software compatibility impact on VMMs both for CSP (e.g., TDRM root VMM 180 and tenant VMM 222), virtualization (e.g., VMX) operation may remain unmodified inside a TD 220 in TD architecture 250. Similarly, operation of VMM software, such as extended page table (EPT) management, can remain under the control of the tenant VMM 222 (if one is active in the TD 220 and is not managed by the TDRM 180). As the TDRM 180 assigns physical memory for each TD 220, the TD architecture 250 includes the MOT (i.e., MOT 160 described with respect to FIGS. 1A and 1B). The processor 112 consults the TDRM 180-managed MOT to assign allocation of memory to TDs 220. This allows the TDRM 180 the full ability to manage memory as a resource without having any visibility into data resident in assigned TD memory. In some implementations, as discussed above, the platform (e.g., root) VMM and TDRM 180 may be in the same encryption key domain, thus sharing the memory management and scheduler functions (but still remaining outside the Tenant's TCB).

Figure 3:
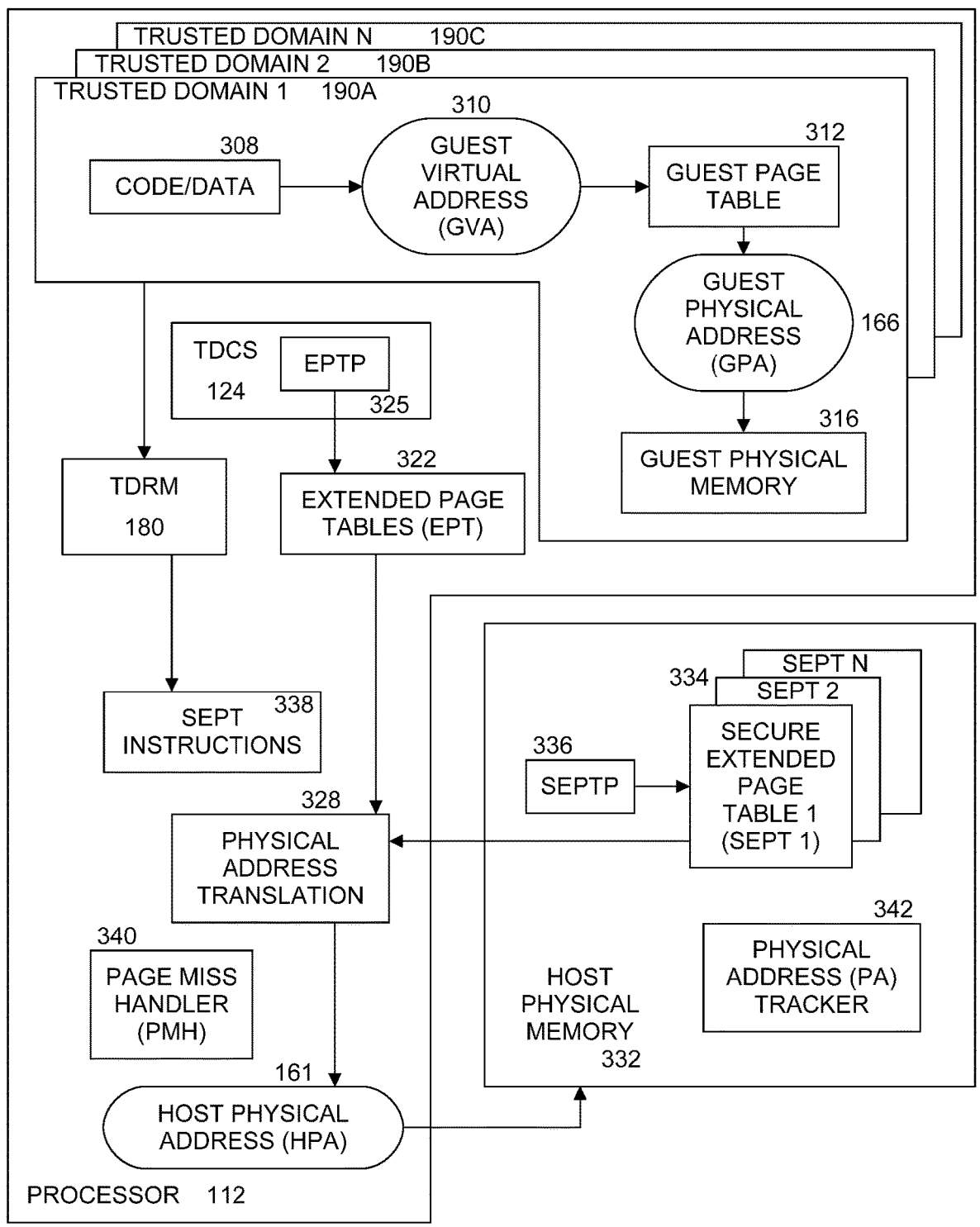
FIG. 3 illustrates another example computing system.

In an embodiment, FIG. 3 illustrates an example computing system 300. One or more Trusted Domains (TDs) from TD 1 190A, TD 2 190B, TD N 190C, where N is a natural number, may be instantiated on computing system 300. Each TD includes code/data 308, which may include references to one or more guest virtual addresses (GVAs) 310. To translate a GVA into a physical address that can be used to access a portion of the computing system's physical memory, a TD may use guest page table 312. Thus, GVA 310 may be translated using guest page table 312 to guest physical address (GPA) 166. GPA 166 may then be mapped to a host physical address (HPA) 161 via EPTs 322, to access host physical memory 332.

Figure 4:
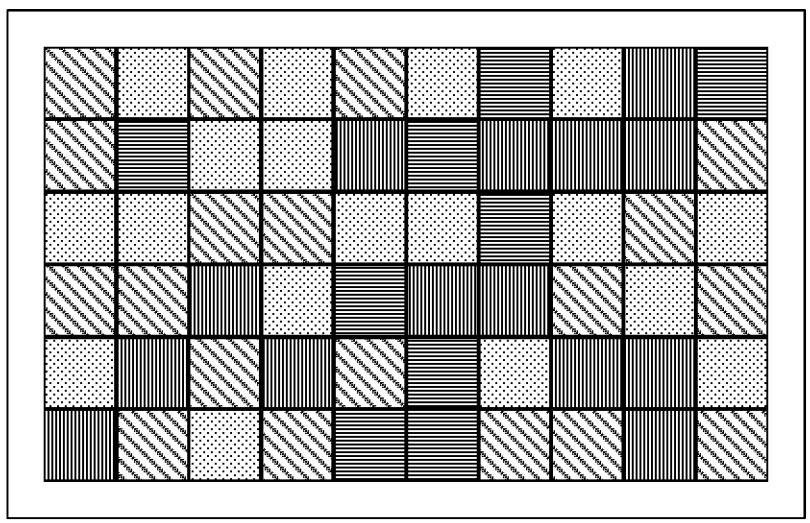
FIG. 4 illustrates an example physical memory.
Figure 4:
Figure 4:
Figure 4:
Figure 4:

FIG. 4 illustrates an example guest physical memory 316. In this example, a plurality of memory pages is shown, with each page associated with a TD being protected by encryption using a different key, such as a unique private key for each TD. For example, pages 402 associated with TD 1 190A may be encrypted with TD 1's key, pages 404 associated with TD 2 190B may be encrypted with TD 2's key, and so on, until pages 406 associated with TD N 190C may be encrypted with TD N's key. Pages 408 not associated with a TD may be protected using memory encryption as is known.

Figure 5:
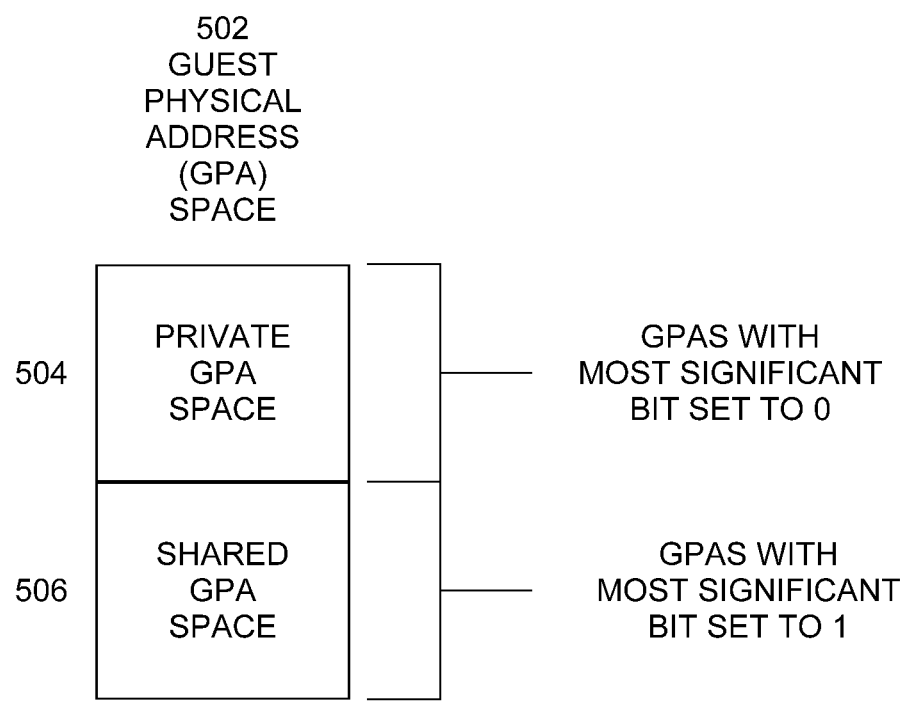
FIG. 5 illustrates an example partition of guest physical address (GPA) space.

FIG. 5 illustrates an example partition of guest physical address (GPA) space. The TD architecture partitions the guest physical address space 502 for guest physical memory 316 into two parts—a private address space 504 and a shared address space 506. Access to pages mapped to private address space 504 may be encrypted and integrity protected with a private key of a TD. Access to pages mapped to the shared address space 506 may be encrypted and integrity protected with a key shared by TD 190A and TDRM 180. In an embodiment, the most significant bit of the GPA is termed as a "Shared" bit. In other embodiments, another predetermined bit of the GPA may be used to indicate shared vs. private status.

Turning back to FIG. 3, TDRM 180 sets up an untrusted EPT 322 that provides the translation of GPA 166 with the "Shared" bit set to 1 (i.e. shared pages). The pointer to this EPT (EPTP) 325 (as specified by the TDRM and stored Trusted Domain Control Structure (TDCS) 124) may be programmed by Page Miss Handler (PMH) 140 of processor 112 when the processor enters a TD mode and may be cleared when the processor exits the TD mode. Embodiments of the present invention introduce one or more secure EPTs (SEPTs) 334 that may be built and managed by the processor 112 hardware. Each TD may have an associated SEPT. After system initialization, the SEPT structure is the same as the EPT, except memory for SEPT pages are protected using TD ephemeral keys (i.e., pages are encrypted and integrity protected). In one embodiment, some of the SW Available/Ignored bits in the SEPT are reserved in the SEPT entries so that the CPU can store micro-architectural state information as needed (such as locks, GPA state, etc.).

The pointer to the SEPT (called SEPTP) 336 may be programmed by Page Miss Handler (PMH) 140 of the processor when the processor enters a TD mode and is cleared when the processor exits TD mode. SEPTs 334 and SEPTP 336 may be stored in a protected area of host physical memory 332 and may not be accessible by or known by TDs. SEPTs 334 and SEPTP 336 may only be accessed by certain components of processor 112 such as page miss handler 140, SEPT instructions 338, and physical address translation 328. In an embodiment, the SEPTs 334 may be stored in protected memory within host physical memory 332. In another embodiment, a SEPT for a TD 190A may be stored in encrypted pages of guest physical memory 316, with the pages being encrypted using the TD's private key.

Figure 6:
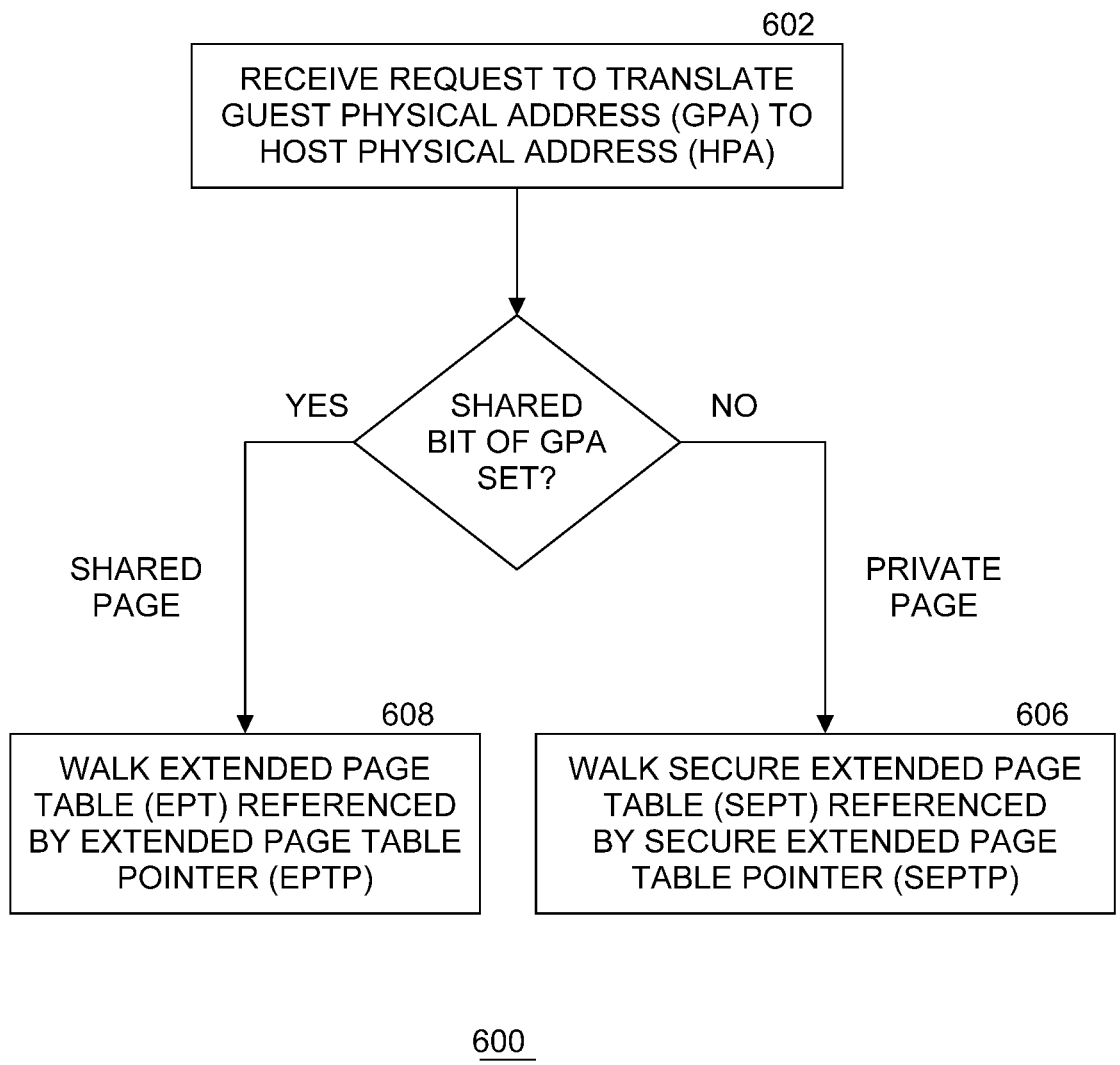
FIG. 6 illustrates an example logic flow of handling address translation for shared pages and private pages.

FIG. 6 illustrates an example logic flow 600 of handling address translation for shared pages and private pages. Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

At block 602, PMH 140 receives a request to translate a guest physical address (GPA) 166 to a host physical address (HPA) 161. At block 604 PMH 140 checks the "Shared" bit of the GPA. When the PMH is requested to translate a GPA with the "Shared" bit set to 0 (i.e., a private page) to a HPA at block 606 the PMH walks (i.e., using known page address translation techniques) the SEPT 334 referenced by the SEPTP 336. For a GPA with "Shared" bit set to 1 (i.e. a shared page), at block 608 the PMH walks the EPT 322 referenced by EPTP 325. In other embodiments, the meaning of the shared bit may be flipped (i.e., a 0 means a private page and a 1 means a shared page). Fault handling/reporting changes may include that if any EPT violations are observed when the SEPTP 336 is used (for "Shared bit"=0 GPAs), an EPT violation exit qualification reports that the TD Exit occurred due to an EPT violation in the SEPT 336. Other embodiments may prevent the TD from executing further if such an EPT violation occurs from SEPT 336.

Since SEPTs 336 are built and managed by the processor, TDRM 180 (or a legacy VMM) cannot influence the GPA to HPA translations for private pages that are performed using the SEPT 334. The VMM 180 specifies the GPA to HPA when assigning pages, but once assigned cannot maliciously remap the GPA without the TD 190A being aware of it.

Turning back now to FIG. 3, physical address (PA) tracker component 342, also called Physical Address Metadata Table (PAMT), is a per 4 KB page meta-data table stored by the CPU in protected memory so that software can never access it. In an embodiment, the PA tracker is used to keep state information for each page with the following fields: PAMT.TYPE=page type—e.g., Regular, Free, TDCS, TDVPS, TDSSA, SEPT, PMDSA etc.; PAMT.OWNER=TDID for Regular, TDVPS for TDSSA; PAMT.EPOCH=for translation lookaside buffer (TLB) tracking; PAMT.LOCK=for page locking.

Figure 7:
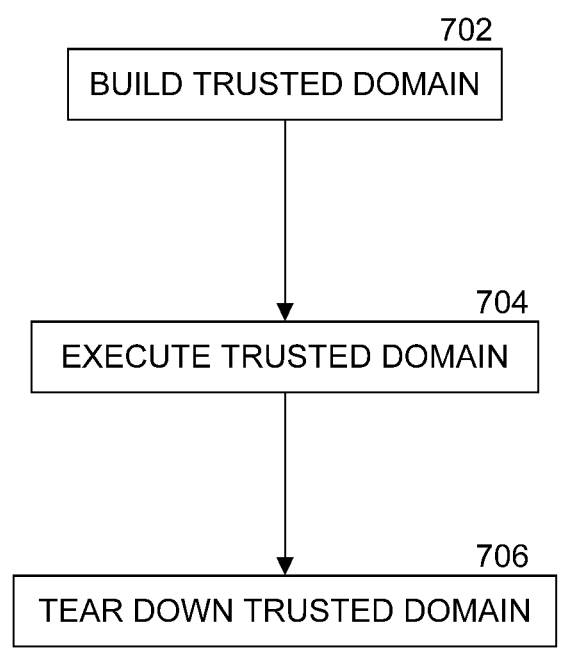
FIG. 7 illustrates an example logic flow for building, executing, and tearing down trusted domains.

FIG. 7 illustrates an example logic flow 700 for building, executing, and tearing down trusted domains. The TD lifecycle shown in FIG. 7 covers all ISA and hardware interactions for TD memory management. At block 702, a trusted domain (TD) may be built. In an embodiment, a TD Build Memory assignment/measurement) may include operations to add SEPT pages and mappings (by using a TDADDSEPT instruction), add pages to the TD with measurement (by using TDADDPAGE and TDEXTEND instructions), and add zero pages to TD post measurement (by using a TDAUGPAGE instruction).

At block 704 a trusted domain may be executed. In an embodiment, TD execution (e.g., use of assigned memory triggers PMH 140 behavior described above) may include operations for memory paging (by using TDBLOCKPAGE, TDEVICT, and TDRELOAD instructions), and for memory Frag/Defrag (by using TDBLOCKPAGE, TDPROMOTE, and TDDEMOTE instructions).

At block 706, a trusted domain may be torn down. In an embodiment, TD teardown may include operations for memory deallocation (by using TDBLOCKPAGE, and TDREMOVE instructions), and memory reclaim for SEPT 134 pages (by using a TDREMOVEPAGE instruction).

Figure 8:
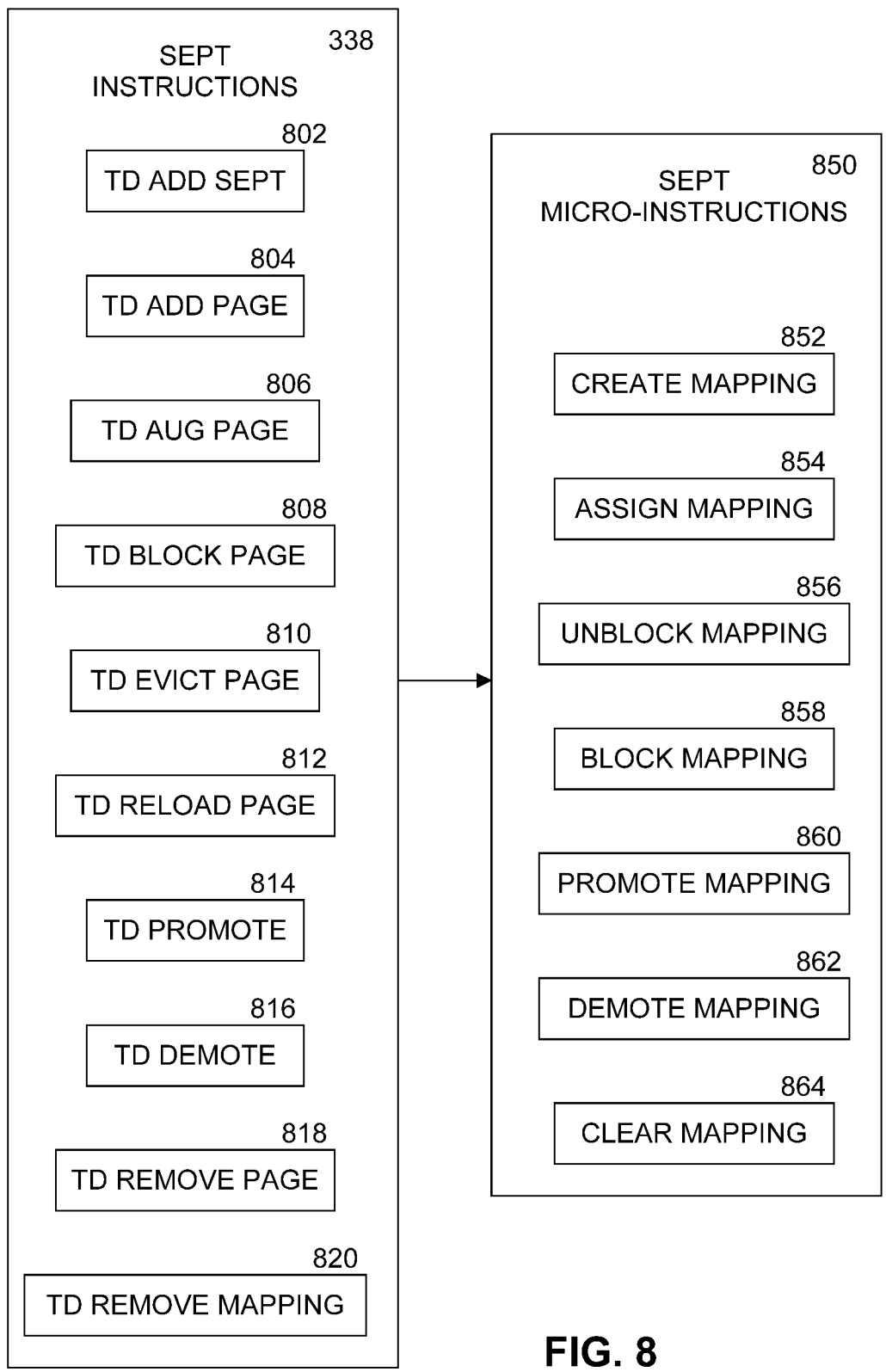
FIG. 8 illustrates an example set of secure extended page table (SEPT) instructions.

The processor provides instructions available to TDRM 180 to call to manage SEPTs 334. FIG. 8 illustrates an example set of secure extended page table (SEPT) instructions 338.

TDADDSEPT 802 This instruction adds a GPA 166 to HPA 161 mapping to the SEPT 334. This instruction adds a mapping to translate the GPA to HPA but sets the mapping as blocked from access. This mapping can be made valid only when the page HPA 161 is physically assigned to the TD 190A using the TDADDPAGE or TDAUGPAGE instruction. This instruction uses the Create Mapping micro-instruction described below to update SEPT 334.

TDADDPAGE 804 This instruction adds a page to the TD 190A. The TDRM 180 specifies the initial contents of this page through a parameter. This instruction first copies the initial contents to the page such that the contents are encrypted with the private encryption key of TD 190A. Subsequently, this instruction also updates and makes the corresponding translation in the SEPT 334 valid such that the TD 190A can now access these pages. This instruction uses the Assign Mapping and Unblock Mapping micro-instructions described below to update SEPT 334.

TDAUGPAGE 806 This instruction is similar to TDADDPAGE but instead of copying an initial content into the page, the instruction initializes the page to zero. This instruction uses the Assign Mapping and Unblock Mapping micro-instructions described below to update SEPT 334.

TDBLOCKPAGE 808 This instruction updates the SEPT 334 mapping of the specified page to a blocked state such that the page cannot be accessed anymore from the TD 190A. This instruction uses the Block Mapping micro-instruction described below to update SEPT 334.

TDEVICTPAGE 810 This instruction updates the SEPT 334 mapping of the specified page to a blocked state such that the page cannot be accessed anymore from the TD 190A. This instruction uses the Block Mapping micro-instruction described below. This instruction then generates a processor key integrity enforced page meta-data that includes GPA 166, permissions and the page contents, so that the TDRM can use the HPA 166 for another TD 190B or VM.

TDRELOADPAGE 812 This instruction first validates the integrity of the page meta-data provided by TDRM 180 and updates the SEPT 334 mapping of the specified GPA 166 passing the integrity checked meta-data to the Assign Mapping and Unblock Mapping micro-instructions described below.

TDPROMOTE 814 This instruction is used by TDRM 180 to TDEVICT/TDRELOAD 4 k pages into a contiguous 2 MB region of memory to "promote" to a larger TLB mapping. The TDRM must track what HPAs 161 are assigned to TDs 190A, 190B, . . . 190C in its page frame number (PFN) database. All operating systemsNMMs that implement memory management manage the state of physical pages in a PFN database. TDRM can then subsequently request promotion/demotion of SEPT structures via this instruction which uses the Promote Mapping micro-instruction described below.

TDDEMOTE 816 This instruction is used by the TDRM to fragment a large page into a contiguous region of smaller pages to demote TLB mappings. The TDRM must track what HPAs 161 are fragmented for the TD 190A in its PFN database. The instruction updates the SEPT 334 structures via the Demote Mapping micro-instruction described below.

TDREMOVEPAGE 818 This instruction removes a page from the TD 190A. The instruction can only be performed for pages that have been previously added to a TD 190A via TDADDPAGE. (i.e. the page may not be removed until one or more valid mapping exists for the HPA 161 in the SEPT 334).

TDREMOVEMAPPING 820 This instruction removes a blocked mapping for a GPA 166 from the SEPT 334 and converts pages back to TDRM 180 ownership when no more outgoing references remain from the SEPT pages. Paging for SEPT pages 334 can be supported by similar TDMAPPINGEVICT and TDMAPPINGRELOAD variants for EPT 122 pages which store specific meta-data for SEPT 334 meta-data (as opposed to regular TD pages). In an embodiment, the instructions TDWBPAGE, TDLDPAGE (not shown in FIG. 8) mark the GPA in the SEPT as "evicted" and then capture the state of the page and encrypt it with a paging key, and the hash of the page, the GPA and the attributes.

FIG. 8 also illustrates an example set of SEPT microinstructions 850 used in implementing the SEPT instructions 338 discussed above.

Create Mapping 852 takes in a GPA 166 as an input parameter to be mapped via SEPT 334 and one HPA 161 destination (no source) to add SEPT pages and insert mappings. Processor 112 verifies GPA 166 does not have the "Shared" bit set, else returns an error. Processor 112 performs a page walk (processor enforces HPAs 161 are not self-referential) through SEPT 334 for the provided GPA 166 establishing if a new HPA 161 is needed. During the page walk, if the page walk requires a new page for the mapping to be complete, the processor does a read check on the provided HPA using a TDRM key ID to ensure that the page is an ordinary page not assigned to any other TD 190A, . . . 190C. Alternately, the processor may use a bit map (looked up HPA) to perform this check. If the page is an ordinary page, then the processor uses the TD Key ID to perform a series of MOVDIR64 operations to clear the SEPT page directory entry (PDE)/page table entry (PTE) page (effectively updating the integrity check value in the memory controller and converting the page to a TD page). For a non-leaf extended page table entry (EPTE), the processor read-modify-writes a cache line with a modified extended page directory/table (x) cache entry (EPxE) to refer to the added HPA 161, updates a reference count for upper level EPxE. If more pages are needed for the mapping to be fully specified, the processor returns an error code to report to the OS, otherwise for a leaf EPTE, processor 112 read-modify-writes a cache line with the modified EPxE to mark GPA 166 as not-present (thus blocking the mapping).

Assign Mapping 854 takes in GPA 166, permissions, an effective address of source page and a destination HPA 161 for a final page to be assigned to the TD 190A, as input parameters. Processor 112 verifies the GPA 166 does not have the "Shared" bit set. The processor performs a page walk returning an error when the processor stalls/needs more pages (then TDRM should use TDADDSEPT to fix the error). If the page walk completes successfully, the processor checks if the mapping is marked as not-present (i.e., a blocked state). For the destination HPA 161, the processor does a read check on the provided HPA using the TDRM key ID to ensure that the page is an ordinary page not assigned to the same or another TD 190A, . . . 190C. This check also prevents aliases to the same TD page. Alternately, the processor may use a bit map (looked up HPA) to perform this check. If this check passes successfully then the processor performs a series of MOVDIR64 writes to the HPA to copy data from the source page to the destination page (either with content or zeros depending on the parameter). For the final EPTE page entry, the processor read-modify-writes to modify EPTE with the destination HPA, perms, and marks it as not-present (i.e., blocked); and updates a reference count on L2 EPTE.

Unblock Mapping 856 takes in GPA 166 as an input parameter. The processor verifies the GPA does not have the "Shared" bit set. The processor performs a page walk returning an error when the processor stalls/needs more pages (then TDRM 180 should use the TDADDSEPT instruction to fix the error). If the page walk completes successfully, the processor checks if the mapping is marked as not-present (i.e., a blocked state). For final EPTE page entry, the processor read-modify-writes to modify EPTE to mark it as present (i.e., unblocked). In an embodiment, the Assign Mapping and Unblock Mapping micro-instructions may be combined for optimizing operations.

Block Mapping 858 takes in GPA 166 as an input parameter. The processor verifies GPA does not have the "Shared" bit set. Processor 112 performs a page walk returning an error when the processor stalls/needs more pages (then TDRM should use the TDADDSEPT instruction to fix the error). If the page walk completes successfully, the processor checks if the mapping is marked as present (i.e., not a blocked state). For final EPTE page entry, the processor read-modify-writes to modify EPTE to mark it as not-present (blocked).

Promote Mapping 860 takes in a GPA 166 and desired size as input parameters. Processor 112 verifies GPA does not have the "Shared" bit set. The processor performs a page walk returning an error when the processor stalls/needs more pages (then TDRM should use the TDADDSEPT instruction to fix the error). If the walk completes successfully, the processor checks if the mapping is marked as not-present (i.e., a blocked state). The processor checks the PDE for the reference count maintained at inner levels (for lower levels) via 9 EPxE available bits and that the page table entry (PTE) page is fully populated (i.e., 512 entries), and all entries are contiguous in HPA space and are marked as blocked. On a success, the processor returns the HPA of the intermediate SEPT page 334 so that the TDRM can TDREMOVE those pages, and unblocks the 2 MB mapping in the SEPT.

Demote Mapping 862 takes in a first HPA, GPA 166, and desired (smaller) size as input parameters. Processor 112 verifies GPA does not have "Shared" bit set. The processor performs a page walk returning an error when the processor stalls/needs more pages (then TDRM should use the TDADDMAPPING instruction to fix the error). If the walk completes successfully, the processor checks if the mapping is marked as not-present (i.e., a blocked state). The processor checks that the leaf EPTE page size should be larger than desired (smaller) size and caches a second HPA of the EPTE and a third HPA of the destination large page. For the first fragmented GPA (for example, the first 4 KB of 2 MB region), the processor uses the Create Mapping microinstruction passing in the GPA of the first fragment region and the first HPA to initialize the new PTE page. On success, for the remaining fragments, the processor uses the Assign Mapping and Unblock Mapping micro-instructions (using offsets from GPA and the third HPA3) to update the EPTEs corresponding to each fragment in the PTE page setup by the Create Mapping micro-instruction in the prior step. The processor updates the reference count for the upper level EPTE (i.e., the second HPA2).

Clear Mapping 864 takes in a GPA 166 as an input parameter. Processor 112 verifies GPA does not have the "Shared" bit set, else the processor returns an error. The processor performs a page walk (processor enforces that HPAs 161 are not self-referential) through SEPT 334 for the provided GPA, establishing if SEPT 334 is not setup, if not the processor returns an error. On reaching the leaf EPTE (the processor caches the previous level entry HPA), the processor read-modify-writes the cache line to update the leaf EPxE to clear the HPA and mark EPTE as not-present (thus blocking the mapping). The processor updates an upper level reference count, and returns the level and reference count to the OS (so that the OS can retry recursively to remove all SEPT pages).

Figure 9:
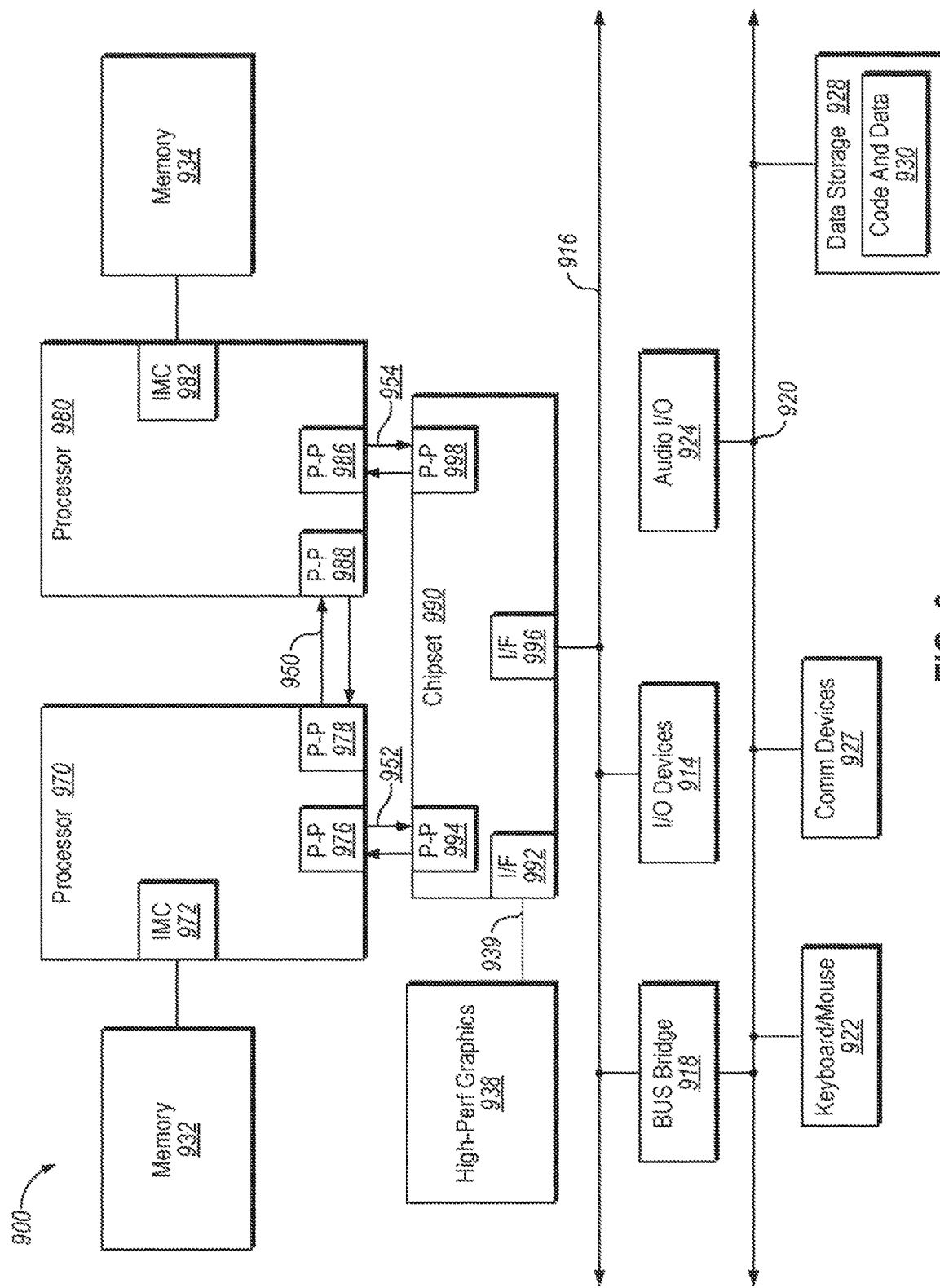
FIG. 9 illustrates an example set of SEPT micro-instructions.

Implementations may be implemented in many different system types. Referring now to FIG. 9, shown is a block diagram of a multiprocessing device system 900 in accordance with an implementation. As shown in FIG. 9, multiprocessing device system 900 is a point-to-point interconnect system, and includes a first processing device 970 and a second processing device 980 coupled via a point-to-point interconnect 950. As shown in FIG. 9, each of processing devices 970 and 980 may be multicore processing devices, including first and second processing device cores (not shown), although potentially many more cores may be present in the processing devices. The processing devices each may include hybrid write mode logics in accordance with an implementation of the present. The implementations of the providing isolation in virtualized systems using trust domains can be implemented in the processing device 970, processing device 980, or both.

While shown with two processing devices 970, 980, it is to be understood that the scope of the disclosure is not so limited. In other implementations, one or more additional processing devices may be present in a given processing device.

Processing devices 970 and 980 are shown including integrated memory controller units 972 and 982, respectively. Processing device 970 also includes as part of its bus controller units point-to-point (P-P) interfaces 976 and 978; similarly, second processing device 980 includes P-P interfaces 986 and 988. Processing devices 970, 980 may exchange information via a point-to-point (P-P) interface 950 using P-P interface circuits 978, 988. As shown in FIG. 9, IMCs 972 and 982 couple the processing devices to respective memories, namely a memory 932 and a memory 934, which may be portions of main memory locally attached to the respective processing devices.

Processing devices 970, 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processing device or outside of both processing devices, yet connected with the processing devices via Pp interconnect, such that either or both processing devices' local cache information may be stored in the shared cache if a processing device is placed into a low power mode. Chipset 990 may be coupled to a first bus 916 via an interface 996. In one implementation, first bus 916 may be a Peripheral Component Interconnect (PCI) bus, or a bus such as a PCI Express bus or another third generation 1/0 interconnect bus, although the scope of the disclosure is not so limited.

As shown in FIG. 9, various 1/0 devices 914 may be coupled to first bus 916, along with a bus bridge 918 which couples first bus 916 to a second bus 920. In one implementation, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one implementation. Further, an audio 1/0 924 may be coupled to second bus 920. Note that other architectures are possible. For example, instead of the point-to-point architecture of FIG. 9, a system may implement a multi-drop bus or other such architecture.

Figure 10:
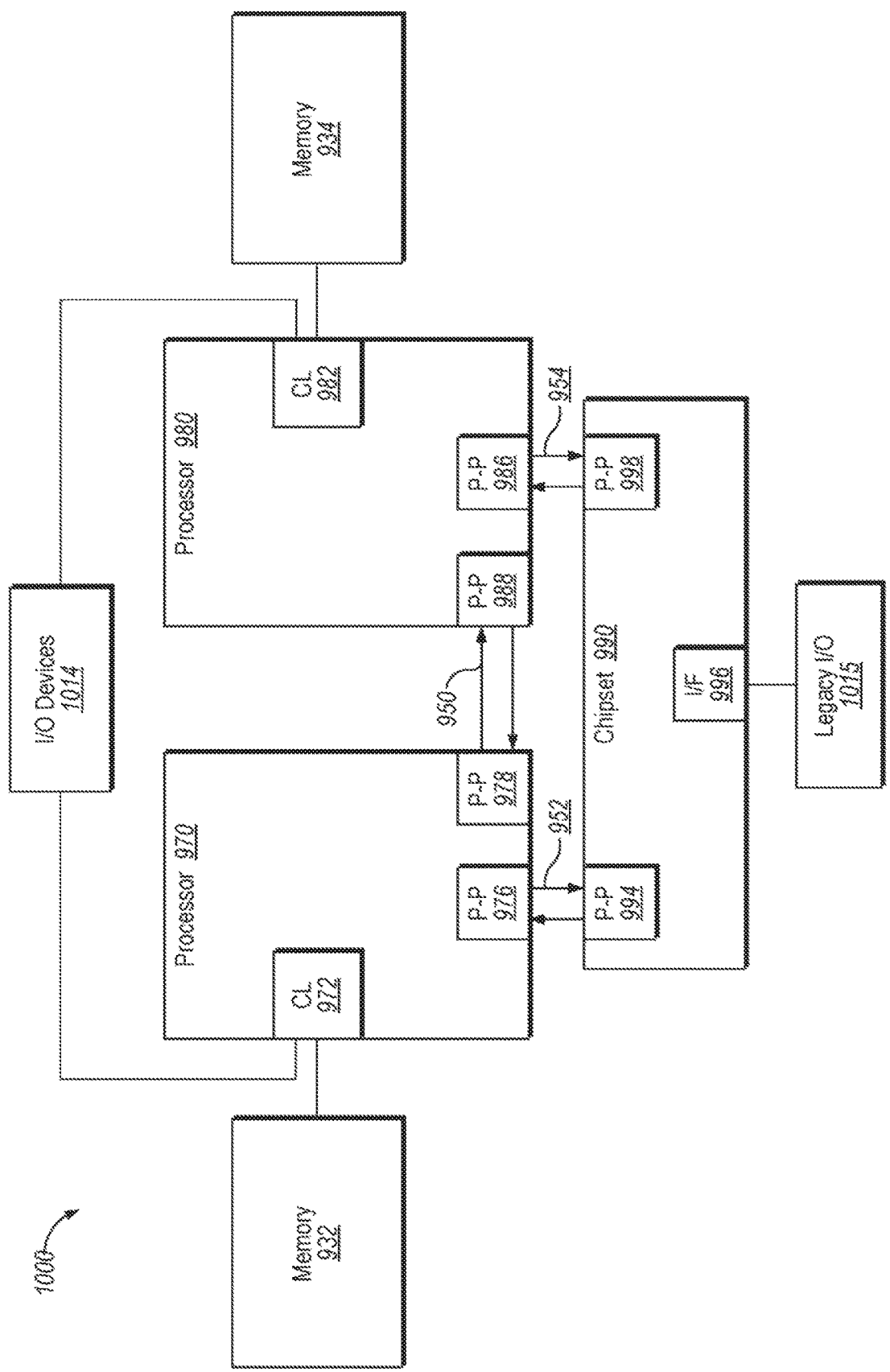
FIG. 10 is a block diagram of a computer system according to another implementation.

Referring now to FIG. 10, shown is a block diagram of a third system 1000 in accordance with an implementation of the disclosure. FIG. 10 illustrates that the processing devices 970, 980 may include integrated memory and I/O control logic ("CL") 972 and 982, respectively. For at least one implementation, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 1014 are also coupled to the control logic 972, 982. Legacy I/O devices 1015 are coupled to the chipset 990. The implementations of the providing isolation in virtualized systems using trust domains can be implemented in processing device 970, processing device 980, or both.

Figure 11:
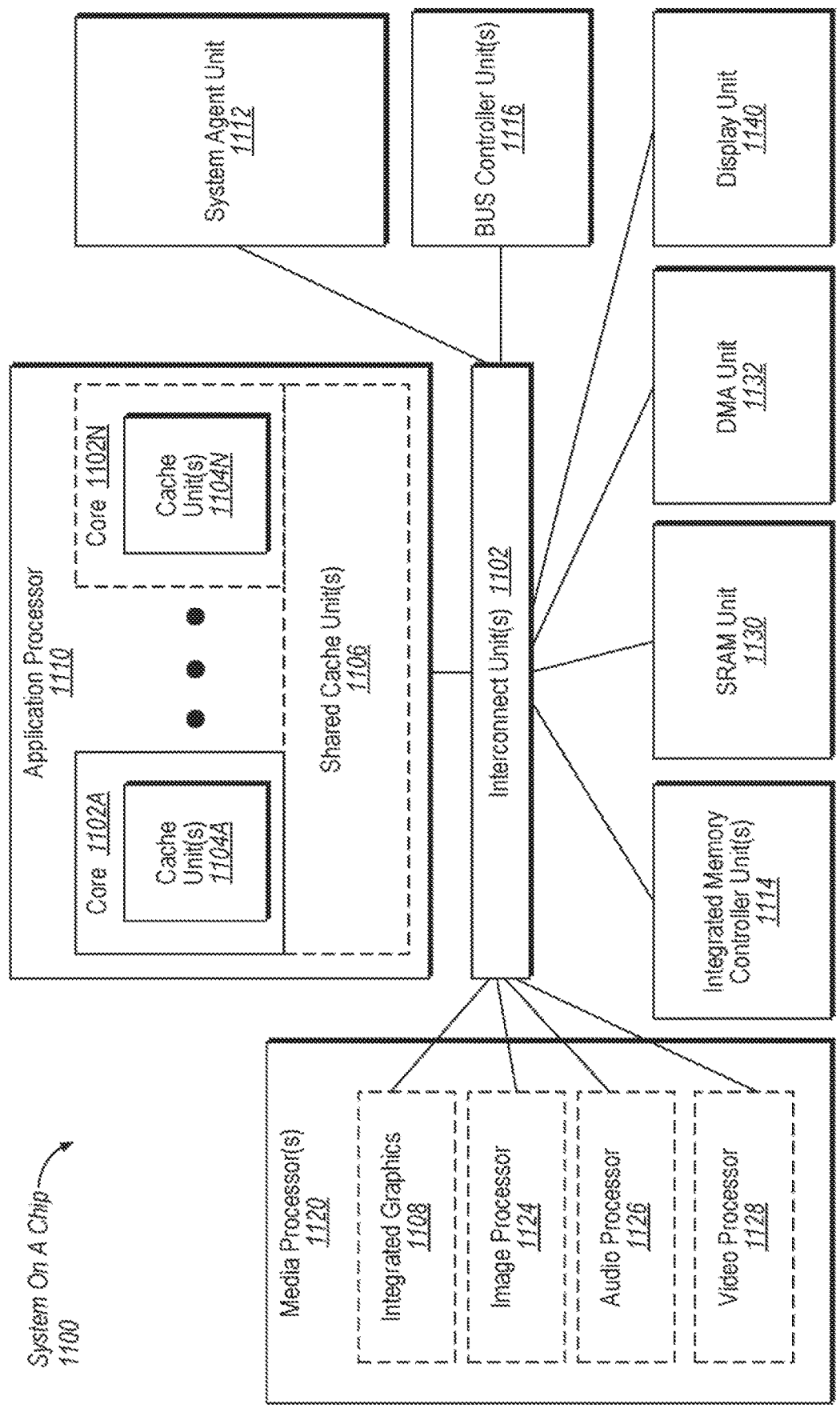
FIG. 11 is a block diagram of a system-on-a-chip according to one implementation.

FIG. 11 is an example system on a chip (SoC) that may include one or more of the cores 1102. Other system designs and configurations known in the arts for laptops, desktops, handheld PCs, personal digital assistants, engineering workstations, servers, network devices, network hubs, switches, embedded processing devices, digital signal processing devices (DSPs), graphics devices, video game devices, set-top boxes, micro controllers, cell phones, portable media players, hand held devices, and various other electronic devices, are also suitable. In general, a huge variety of systems or electronic devices capable of incorporating a processing device and/or other execution logic as disclosed herein are generally suitable.

Referring now to FIG. 11, shown is a block diagram of a SoC 1100 in accordance with an implementation of the disclosure. Also, dashed lined boxes are features on more advanced SoCs. In FIG. 11, an interconnect unit(s) 1102 is coupled to an application processing device 1110 which includes a set of one or more cores 1102A-N and shared cache unit(s) 1106; a system agent unit 1112; a bus controller unit(s) 1116; an integrated memory controller unit(s) 1114; a set or one or more media processing devices 1120 which may include integrated graphics logic 1108, an image processing device 1124 for providing still and/or video camera functionality, an audio processing device 1126 for providing hardware audio acceleration, and a video processing device 1128 for providing video encode/decode acceleration; a static random access memory (SRAM) unit 1130; a direct memory access (DMA) unit 1132; and a display unit 1140 for coupling to one or more external displays. The implementations of the providing isolation in virtualized systems using trust domains can be implemented in SoC 1100.

Figure 12:
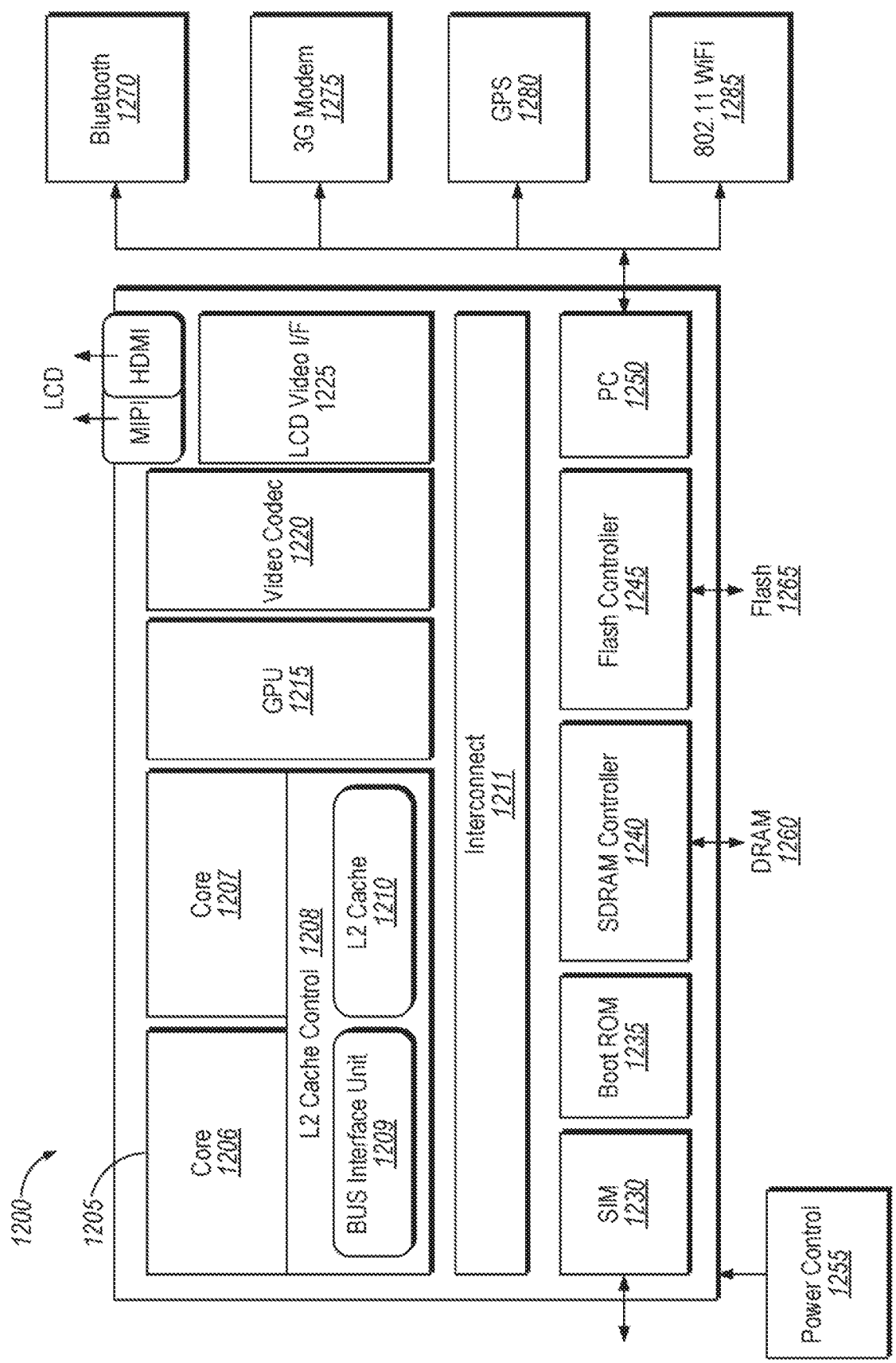
FIG. 12 illustrates another implementation of a block diagram for a computing system.

Turning next to FIG. 12, an implementation of an SoC design in accordance with implementations of the disclosure is depicted. As an illustrative example, SoC 1200 is included in user equipment (UE). In one implementation, UE refers to any device to be used by an end-user to communicate, such as a hand-held phone, smartphone, tablet, ultra-thin notebook, notebook with broadband adapter, or any other similar communication device. AUE may connect to a base station or node, which can correspond in nature to a mobile station (MS) in a GSM network. The implementations of the providing isolation in virtualized systems using trust domains can be implemented in SoC 1200.

Here, SoC 1220 includes 2 cores—1206 and 1207. Similar to the discussion above, cores 1206 and 1207 may conform to an Instruction Set Architecture, such as a processing device having the Intel® Architecture Core™, an Advanced Micro Devices, Inc. (AMD) processing device, a MIPS-based processing device, an ARM-based processing device design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnects discussed above, which can implement one or more aspects of the described disclosure.

Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the implementations described herein.

In addition, the system illustrates peripherals for communication, such as a Bluetooth module 1270, 3G modem 1275, GPS 1280, and Wi-Fi 1285. Note as stated above, a UE includes a radio for communication. As a result, these peripheral communication modules may not all be included. However, in a UE some form of a radio for external communication should be included.

Figure 13:
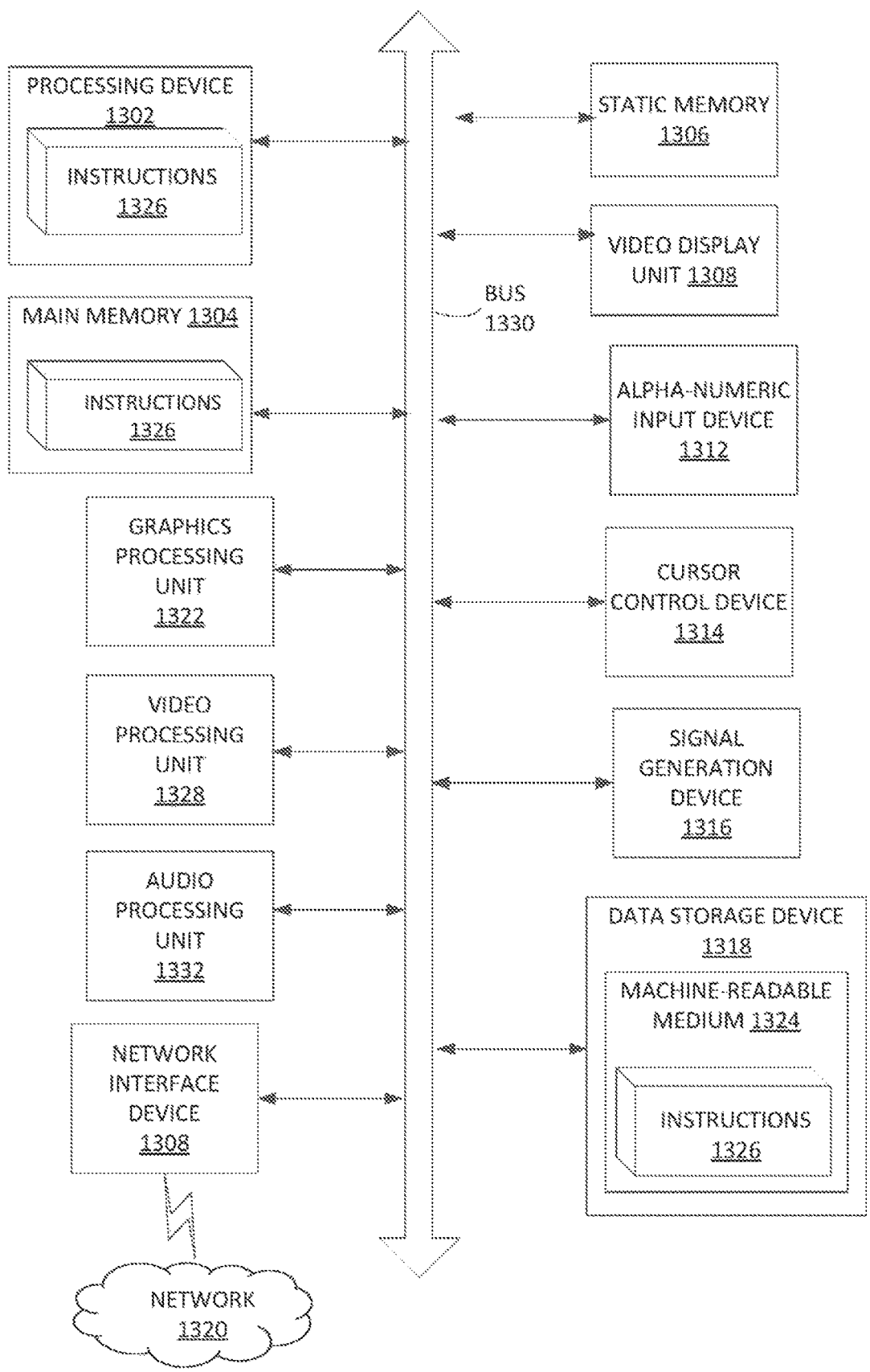
FIG. 13 illustrates another implementation of a block diagram for a computing system.

FIG. 13 illustrates a diagrammatic representation of a machine in the example form of a computing system 1300 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections can be implemented in computing system 1300.

The computing system 1300 includes a processing device 1302, main memory 1304 (e.g., read-only memory (ROM), flash memory, dynamic random-access memory (DRAM) (such as synchronous DRAM (SDRAM) or DRAM (RDRAM), etc.), a static memory 1306 (e.g., flash memory, static random-access memory (SRAM), etc.), and a data storage device 1318, which communicate with each other via a bus 1330.

Processing device 1302 represents one or more general-purpose processing devices such as a micro-processing device, central processing unit, or the like. More particularly, the processing device may be complex instruction set computing (CISC) micro-processing device, reduced instruction set computer (RISC) micro-processing device, very long instruction word (VLIW) micro-processing device, or processing device implementing other instruction sets, or processing devices implementing a combination of instruction sets. Processing device 1302 may also be one or more special-purpose processing devices such as an application specific integrated circuit (ASIC), a field programmable gate array (FPGA), a digital signal processing device (DSP), network processing device, or the like. In one implementation, processing device 1302 may include one or processing device cores. The processing device 1302 is configured to execute the processing logic 1326 for performing the operations discussed herein. In one implementation, processing device 1302 can be part of the computing system 100 of FIG. 1. Alternatively, the computing system 1300 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1300 may further include a network interface device 1308 communicably coupled to a network 1320. The computing system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computing system 1300 may include a graphics processing unit 1322, a video processing unit 1328 and an audio processing unit 1332. In another implementation, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored software 1326 embodying any one or more of the methodologies of functions described herein. The software 1326 may also reside, completely or at least partially, within the main memory 1304 as instructions 1326 and/or within the processing device 1302 as processing logic 1326 during execution thereof by the computing system 1300; the main memory 1304 and the processing device 1302 also constituting computer-readable storage media.

The computer-readable storage medium 1324 may also be used to store instructions 1326 utilizing the processing device 1302, such as described with respect to FIG. 1, and/or a software library containing methods that call the above applications. While the computer-readable storage medium 1324 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the implementations. The term "computer readable storage medium" shall accordingly be taken to include, but not be limited to, solid-state memories, and optical and magnetic media.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processing devices and system configurations, specific hardware structures, specific architectural and micro architectural details, specific register configurations, specific instruction types, specific system components, specific measurements/heights, specific processing device pipeline stages and operation etc. in order to provide a thorough understanding of the disclosure. It will be apparent, however, to one skilled in the art that these specific details need not be employed to practice the disclosure. In other instances, well known components or methods, such as specific and alternative processing device architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the disclosure.

The implementations are described with reference to providing isolation in virtualized systems using trust domains in specific integrated circuits, such as in computing platforms or micro-processing devices. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processing device, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processing device or machine that performs data manipulations. However, the disclosure is not limited to processing devices or machines that perform 512 bit, 256 bit, 128 bit, 64 bit, 32 bit, or 16 bit data operations and can be applied to any processing device and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the below examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processing device that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a O or a 1 during operation. But a logic gate 'configured to' provide an enable signal to a clock does not include every potential logic gate that may provide a 1 or 0. Instead, the logic gate is one coupled in some manner that during operation the 1 or O output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and O's, which simply represents binary logic states. For example, a 1 refers to a high logic level and O refers to a low logic level. In one implementation, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine accessible, machine readable, computer accessible, or computer readable medium which are executable by a processing element. A non-transitory machine accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from. Instructions used to program logic to perform implementations of the disclosure may be stored within a memory in the system, such as DRAM, cache, flash memory, or other storage. Furthermore, the instructions can be distributed via a network or by way of other computer readable media. Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, embodiment, and/or other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus comprising:
   a processor including
      instruction set architecture (ISA) circuitry to execute or more secure extended page table (SEPT) instructions to walk at least one SEPT stored in a protected area of a host physical memory that is inaccessible by an untrusted virtual machine manager (VMM); and physical address translation circuitry to translate a guest physical address of a guest physical memory to a host physical address of the host physical memory using the at least one SEPT.

2. The apparatus of claim 1, comprising an untrusted EPT pointer (EPTP) to reference at least one untrusted EPT and a secure SEPT pointer (SEPTP) to reference the at least one SEPT.

3. The apparatus of claim 2, comprising a guest physical address space for the guest physical memory divided into a shared guest physical address space and a private guest physical address space.

4. The apparatus of claim 3, wherein the physical address translation circuitry is configured to read at least one selected bit of the guest physical address to determine whether to walk the at least one untrusted EPT to translate the guest physical address accessing the shared guest physical address space to the host physical address, or the at least one SEPT to translate the guest physical address accessing the private guest physical address space to the host physical address, based on the value of the at least one selected bit.

5. The apparatus of claim 4, wherein the processor is configured to encrypt at least one page of the host physical memory reached via translation of the private guest physical address with a key of a trusted domain (TD).

6. The apparatus of claim 2, comprising page miss handler (PMH) circuitry to load at least one EPTP and at least one SEPTP when a trusted domain is initialized and entered on a logical processor.

7. The apparatus of claim 1, comprising a trusted domain resource manager (TDRM) to call the one or more SEPT instructions to manage the at least one SEPT.

8. The apparatus of claim 1, wherein the at least one SEPT is encrypted with one of a key of a trusted domain and a processor key.

9. A system, comprising:
a host physical memory including a protected area that is inaccessible by an untrusted virtual machine manager (VMM) to store at least one secure extended page table (SEPT);
a processor, coupled to the host physical memory, the processor including
instruction set architecture (ISA) circuitry to execute one or more SEPT instructions to walk the at least one SEPT; and
a physical address translation component to translate a guest physical address of a guest physical memory to a host physical address of the host physical memory using the SEPT.

10. The system of claim 9, the processor comprising an untrusted EPT pointer (EPTP) to reference at least one untrusted EPT and the host physical memory comprising a protected SEPT pointer (SEPTP) to reference the at least one SEPT.

11. The system of claim 10, wherein the physical address translation component is configured to read at least one selected bit of the guest physical address to determine whether to walk the at least one untrusted EPT to translate the guest physical address accessing the shared guest physical address space to the host physical address, or the at least one SEPT to translate the guest physical address accessing the private guest physical address space to the host physical address, based on the value of the at least one selected bit.

12. The system of claim 11, wherein the processor is configured to encrypt at least one page of the host physical memory reached via translation of the private guest physical address with a key of a trusted domain (TD).

13. The system of claim 10, comprising page miss handler circuitry to load at least one EPTP and at least one SEPTP when a trusted domain is initialized and entered on a logical processor.

14. The system of claim 9, comprising a guest physical address space for the guest physical memory divided into a shared guest physical address space and a private guest physical address space.

15. The system of claim 9, comprising a trusted domain resource manager (TDRM) to call the one or more SEPT instructions to manage the at least one SEPT.

16. The system of claim 9, wherein the at least one SEPT is encrypted with one of a key of a trusted domain and a processor key.

17. A method comprising:
receiving a request to translate a guest physical address of a guest physical memory to a host physical address of a host physical memory;
determining if a shared bit of the guest physical address is set;
and
walking a secure extended page table (SEPT) to translate the guest physical address when the shared bit is not set, the SEPT being stored in a protected area of the host physical memory that is inaccessible by an untrusted virtual machine manager (VMM), the walking of the SEPT being performed by executing one or more SEPT instructions of an instruction set architecture (ISA) of a processor.

18. The method of claim 17, comprising storing the SEPT in a protected area of the host physical memory using encryption and integrity protection using a key of a trusted domain.

19. The method of claim 17, wherein an untrusted EPT is referenced by an untrusted EPT pointer (EPTP) and the SEPT is referenced by a secure SEPT pointer (SEPTP).

20. The method of claim 17, comprising dividing a guest physical address space for the guest physical memory into a shared guest physical address space and a private guest physical address space.

21. The method of claim 17, comprising encrypting at least one page of the host physical memory reached via translation of the private guest physical address with a key of a trusted domain (TD).

* * * * *